United States Patent
Abe et al.

(10) Patent No.: US 10,096,812 B2
(45) Date of Patent: *Oct. 9, 2018

(54) BATTERY, BATTERY PACK, ELECTRONIC APPARATUS, ELECTRICALLY DRIVEN VEHICLE, ELECTRICAL STORAGE DEVICE, AND POWER SYSTEM

(71) Applicant: Sony Corporation, Tokyo (JP)

(72) Inventors: Tomohiro Abe, Fukushima (JP); Kentaro Takagi, Fukushima (JP)

(73) Assignee: Murata Manufacturing Co., Ltd., Kyoto (JP)

(*) Notice: Subject to any disclaimer, the term of this patent is extended or adjusted under 35 U.S.C. 154(b) by 41 days.

This patent is subject to a terminal disclaimer.

(21) Appl. No.: 15/585,541

(22) Filed: May 3, 2017

(65) Prior Publication Data

US 2017/0250391 A1 Aug. 31, 2017

Related U.S. Application Data

(63) Continuation of application No. 14/650,441, filed as application No. PCT/JP2014/004280 on Aug. 21, 2014, now Pat. No. 9,647,256.

(30) Foreign Application Priority Data

Oct. 15, 2013 (JP) .................................. 2013-215006

(51) Int. Cl.
  *H01M 2/18* (2006.01)
  *H01M 4/525* (2010.01)
  (Continued)

(52) U.S. Cl.
  CPC ........... *H01M 2/18* (2013.01); *B60L 11/1861* (2013.01); *H01M 2/162* (2013.01);
  (Continued)

(58) Field of Classification Search
  CPC combination set(s) only.
  See application file for complete search history.

(56) References Cited

U.S. PATENT DOCUMENTS 8,137,846 B2    3/2012   Nakashima et al.
9,455,091 B2    9/2016   Miyazaki et al.
(Continued)

FOREIGN PATENT DOCUMENTS

CN     103094609 A    5/2013
JP      2002-359005 A   12/2002
(Continued)

OTHER PUBLICATIONS

European Patent Office, Extended European Search Report issued in connection with application No. 14853251.8 dated May 29, 2017 (10 pages).

(Continued)

*Primary Examiner* — Kaity V Chandler
(74) *Attorney, Agent, or Firm* — K&L Gates LLP

(57) ABSTRACT

A battery is provided. The battery including a positive electrode that includes a positive electrode current collector and a positive electrode active material layer provided on the positive electrode current collector; a negative electrode; and a separator that includes at least a porous film; wherein the porous film satisfies the following equations:

$$0.04 \leq Ri \leq -0.07L - 0.09 \times S + 4.99$$

$$Ri = \tau^2 L/\varepsilon'$$

$$\varepsilon' = [\{(L\varepsilon/100) - Rz \times 0.46/3\}/L] \times 100$$

$$\tau = \{(1.216 \times \varepsilon T d \times 10^{-4})/L\}^{0.5}$$

where $Ri$ represents a film resistance (μm), $L$ represents a film thickness (μm), $\tau$ represents a tortuosity factor, $T$
(Continued)

represents air permeability (sec/100 cc), d represents a pore size (nm), Rz represents a surface roughness maximum height (μm), $\varepsilon$ represents a porosity (%), $\varepsilon'$ represents a corrected porosity (%), and S represents an area density of the positive electrode active material layer (mg/cm$^2$).

27 Claims, 13 Drawing Sheets

(51) Int. Cl.

| | | |
|---|---|---|
| H01M 4/131 | (2010.01) | |
| H01M 4/62 | (2006.01) | |
| H01M 2/16 | (2006.01) | |
| B60L 11/18 | (2006.01) | |
| H01M 10/04 | (2006.01) | |
| H01M 10/0525 | (2010.01) | |
| H01M 10/0565 | (2010.01) | |
| H01M 10/42 | (2006.01) | |
| H02J 7/00 | (2006.01) | |
| H01M 10/052 | (2010.01) | |
| H01M 10/058 | (2010.01) | |
| H01M 10/0587 | (2010.01) | |
| H01M 4/02 | (2006.01) | |

(52) U.S. Cl.
CPC ......... *H01M 2/1653* (2013.01); *H01M 4/131* (2013.01); *H01M 4/525* (2013.01); *H01M 4/622* (2013.01); *H01M 4/625* (2013.01); *H01M 10/0431* (2013.01); *H01M 10/0525* (2013.01); *H01M 10/0565* (2013.01); *H01M 10/4257* (2013.01); *H02J 7/0063* (2013.01); *H01M 2/16* (2013.01); *H01M 10/052* (2013.01); *H01M 10/058* (2013.01); *H01M 10/0587* (2013.01); *H01M 2004/021* (2013.01); *H01M 2004/028* (2013.01); *H01M 2010/4278* (2013.01); *H01M 2220/20* (2013.01); *H01M 2220/30* (2013.01); *H01M 2300/0082* (2013.01); *H02J 7/0031* (2013.01); *H02J 7/0042* (2013.01); *Y02E 60/122* (2013.01); *Y02T 10/7011* (2013.01)

(56) References Cited

U.S. PATENT DOCUMENTS

| | | |
|---|---|---|
| 2002/0192561 A1 | 12/2002 | Noh |
| 2010/0173187 A1 | 7/2010 | Nishikawa et al. |
| 2011/0206962 A1 | 8/2011 | Minami et al. |
| 2012/0011706 A1 | 1/2012 | Murase et al. |
| 2012/0015229 A1 | 1/2012 | Ohashi et al. |
| 2013/0130092 A1 | 5/2013 | Roth et al. |
| 2013/0300374 A1 | 11/2013 | Tomita et al. |
| 2014/0057165 A1 | 2/2014 | Yamakaji et al. |
| 2015/0024258 A1 | 1/2015 | Sumiyama et al. |
| 2015/0050545 A1 | 2/2015 | Murata et al. |
| 2015/0243449 A1 | 8/2015 | Okada et al. |

FOREIGN PATENT DOCUMENTS

| | | |
|---|---|---|
| JP | 2007-280749 A | 10/2007 |
| JP | 4075259 B2 | 4/2008 |
| JP | 2010-232105 A | 10/2010 |
| JP | 2011-171250 A | 9/2011 |
| JP | 2011-181195 A | 9/2011 |
| JP | 2011-204593 A | 10/2011 |
| JP | 2012-048918 A | 3/2012 |
| JP | 2012-099324 A | 5/2012 |
| JP | 2013-080676 A | 5/2013 |
| JP | 2013-106372 A | 5/2013 |
| JP | 2013-203894 A | 10/2013 |
| WO | 2008/156033 A1 | 12/2008 |
| WO | 2013-129009 A | 9/2013 |

OTHER PUBLICATIONS

Office Action issued in connection with counterpart Chinese Patent Application No. 201480003392.5, dated Feb. 27, 2018. (5 pages).
Search Report issued in connection with counterpart Chinese Patent Application No. 201480003392.5, dated Feb. 27, 2018. (2 pages).
Japanese Office Action dated Jul. 10, 2018, in corresponding Japanese Application No. 2015-521897.
International Search Report issued in connection with international application No. PCT/JP2014/004280, dated Oct. 14, 2014 (2 pages).

BATTERY, BATTERY PACK, ELECTRONIC APPARATUS, ELECTRICALLY DRIVEN VEHICLE, ELECTRICAL STORAGE DEVICE, AND POWER SYSTEM

CROSS-REFERENCE TO RELATED APPLICATIONS

The present application is a continuation of U.S. application Ser. No. 14/650,441, filed Jun. 8, 2015, which is a national stage of International Application No. PCT/JP2014/004280, filed Aug. 21, 2014, which claims priority to Japanese Application No. 2013-215006, filed Oct. 15, 2013, the disclosures of which are hereby incorporated by reference herein.

BACKGROUND

The present disclosure relates to a battery, a battery pack, an electronic apparatus, an electrically driven vehicle, an electrical storage device, and a power system.

Recently, a lot of portable electronic apparatuses have appeared in the market, and a reduction in size and weight has been attempted. In a battery that is used as a power supply of each of the portable electronic apparatuses, miniaturization of the battery or effective use of an accommodation space inside the portable electronic apparatus has been demanded so as to realize the reduction in size and weight.

As a battery that satisfies such demand, it is known that a lithium ion secondary battery having a large energy density is most suitable. As the lithium ion secondary battery, a lithium ion secondary battery using a laminate film as an exterior member has come into practical use when considering, for example, high energy density with small weight, the possibility of manufacturing the exterior packaging member with a very thin form, and the like.

In the battery using the laminate film as the exterior packaging member, application of an electrolyte solution as an electrolyte and a matrix polymer compound that retains the electrolyte solution has been performed for the sake of liquid leakage resistance and the like, and this battery has been known as a gel electrolyte battery. PTL 1 to PTL 3 disclose technologies relating to a separator that is used in the gel electrolyte battery.

CITATION LIST

Patent Literature

PTL 1: Japanese Patent No. 4075259
PTL 2: Japanese Unexamined Patent Application Publication No. 2007-280749
PTL 3: Japanese Unexamined Patent Application Publication No. 2012-48918

SUMMARY

Technical Problem

In a battery, it is necessary to suppress deterioration in a capacity due to repetition of charging and discharging.

Accordingly, an object of the present disclosure is to provide a battery capable of suppressing deterioration in a capacity due to repetition of charging and discharging, and a battery pack, an electronic apparatus, an electrically driven vehicle, an electrical storage device, and a power system which use the battery.

Solution to Problem

To solve the above-described problem, according to an aspect of the present disclosure, there is provided a battery including: a positive electrode that includes a positive electrode current collector, and a positive electrode active material layer which includes a positive electrode active material and is provided on both surfaces of the positive electrode current collector; a negative electrode; a separator that includes at least a porous film; and an electrolyte. The positive electrode active material includes a positive electrode material including a lithium cobalt composite oxide which has a layered structure and includes at least lithium and cobalt, an area density S ($mg/cm^2$) of the positive electrode active material layer is 27 $mg/cm^2$ or greater, and the porous film satisfies the following Expressions.

$$0.04 \leq Ri \leq -0.07L - 0.09 \times S + 4.99$$

$$Ri = \tau^2 L/\varepsilon'$$

$$\varepsilon' = [\{(L \times \varepsilon/100) - Rz \times 0.46/3\}/L] \times 100$$

$$\tau = \{(1.216 \times \varepsilon' \cdot Td \times 10^{-4})/L\}^{0.5} \quad \text{(Expressions)}$$

[provided that, Ri: a film resistance (μm), L: a film thickness (μm), τ: a tortuosity factor, T: air permeability (sec/100 cc), d: a pore size (nm), Rz: a surface roughness maximum height (the sum of values of a front surface and a rear surface) (μm), ε: porosity (%), ε': corrected porosity (%), and S: the area density of the positive electrode active material layer ($mg/cm^2$)].

According to other embodiments of the present disclosure, a battery pack, an electronic apparatus, an electrically driven vehicle, an electrical storage device, and a power system which include the above-described battery are provided.

Advantageous Effects of Invention

According to the present disclosure, it is possible to suppress deterioration in capacity due to repetition of charging and discharging of a battery.

Additional features and advantages are described herein, and will be apparent from the following Detailed Description and the figures.

DETAILED DESCRIPTION (Technical Background)

Figure 1:
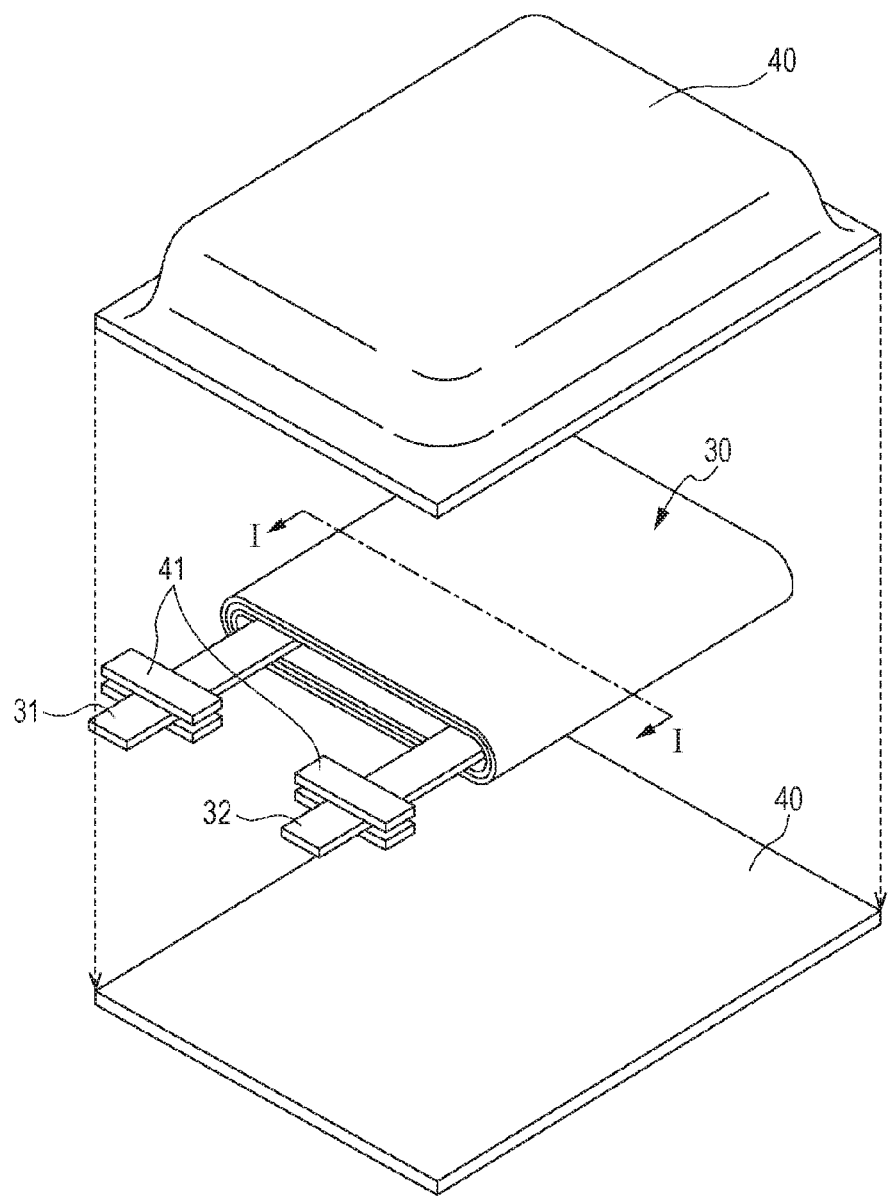
FIG. 1 is an exploded perspective view illustrating a configuration of a laminate film type nonaqueous electrolyte battery according to a first embodiment of the present disclosure.

First, the technical background of the present disclosure will be described for easy understanding of the present disclosure. PTL 1 (Japanese Patent No. 4075259) described in [Background Art] discloses a battery in which a separator having a film thickness of 5 μm to 16 μm and a porosity of 25% to 60% is used, and which includes a Co-based positive electrode including lithium cobaltate and the like, and a gel electrolyte.

However, in the battery disclosed in PTL 1, the relationship between the area density of a positive electrode active material layer and the thickness of the separator is not considered. Therefore, for example, in a case where the area density of the positive electrode active material layer is set to 27 mg/cm$^2$ or greater, the electrode length decreases and thus the amount of active material may decrease in comparison to the case of using a separator of the present disclosure in a battery having the same size, and thus the energy density of the battery decreases.

In addition, in this case, when using a separator outside of the range in the present disclosure, it is difficult to mitigate an over-voltage that is caused by a current density that increases due to the area density of the positive electrode active material layer, and thus the cycle lifespan is apt to decrease due to a decomposition reaction of an electrolyte solution.

PTL 2 (Japanese Unexamined Patent Application Publication No. 2007-280749) discloses a technology capable of providing a battery excellent in cycle characteristics by using a separator having air permeability of 80 sec/100 cc to 300 sec/100 cc.

However, in the case of applying the technology disclosed in PTL 2 to a separator having a large film thickness, ion permeability of the separator decreases, and thus a local over-voltage on an electrode surface tends to increase during charging and discharging. Particularly, in a case where the area density of an electrode increases beyond an arbitrary range, clogging of the separator occurs due to electrolyte solution decomposition due to the over-voltage, and as a result, the cycle characteristics deteriorate.

PTL 3 (Japanese Unexamined Patent Application Publication No. 2012-48918) discloses a configuration capable of providing a battery excellent in cycle characteristics in the case of using a separator in which the film thickness is 5 μm to 25 μm, and the number of pores per unit area in the separator is 200 or greater.

However, in the battery disclosed in PTL 3, in the case where the area density of the positive electrode active material layer is equal to or greater than an arbitrary constant range (for example, 27 mg/cm$^2$ or greater), there are ranges of the air permeability and the porosity of the separator at which clogging of the separator due to the over-voltage is promoted. Therefore, in the case of using the separator, in which the air permeability and the porosity are in the ranges, in a battery in which the area density of the positive electrode active material layer is equal to or greater than an arbitrary constant range, the cycle characteristics deteriorate.

Accordingly, the present inventors have obtained the following finding after a thorough examination. In a case where the area density of the positive electrode active material layer is set to 27 mg/cm$^2$ or greater, when using a separator having a predetermined structure, the following effect can be obtained.

It is possible to increase the amount of an active material per the same volume, and thus it is possible to improve the energy density. The amount of the active material per unit area in an electrode is improved, and thus the over-voltage that increases due to an increase in the current density is mitigated. Accordingly, it is possible to improve the cycle characteristics. In the case where the battery is charged with a high charging voltage, the decomposition of the electrolyte solution tends to occur more. Accordingly, it is possible improve the cycle characteristics by suppressing an increase in the over-voltage.

Hereinafter, embodiments of the present disclosure will be described with reference to the accompanying drawings. In addition, description will be made in the following order.

1. First Embodiment (Battery)
2. Second Embodiment (Example of Battery Pack)
3. Third Embodiment (Example of Battery Pack)
4. Fourth Embodiment (Example of Electrical Storage System)
5. Other Embodiments (Modification Example)

In addition, the following embodiments and the like are preferred specific examples of the present disclosure, and the content of the present disclosure is not limited to the embodiments and the like. In addition, effects that are described in this specification are illustrative only, and there is no limitation thereto. In addition, it should be understood that existence of effects different from the exemplified effects is possible.

1. First Embodiment (Configuration of Battery)

Figure 2:
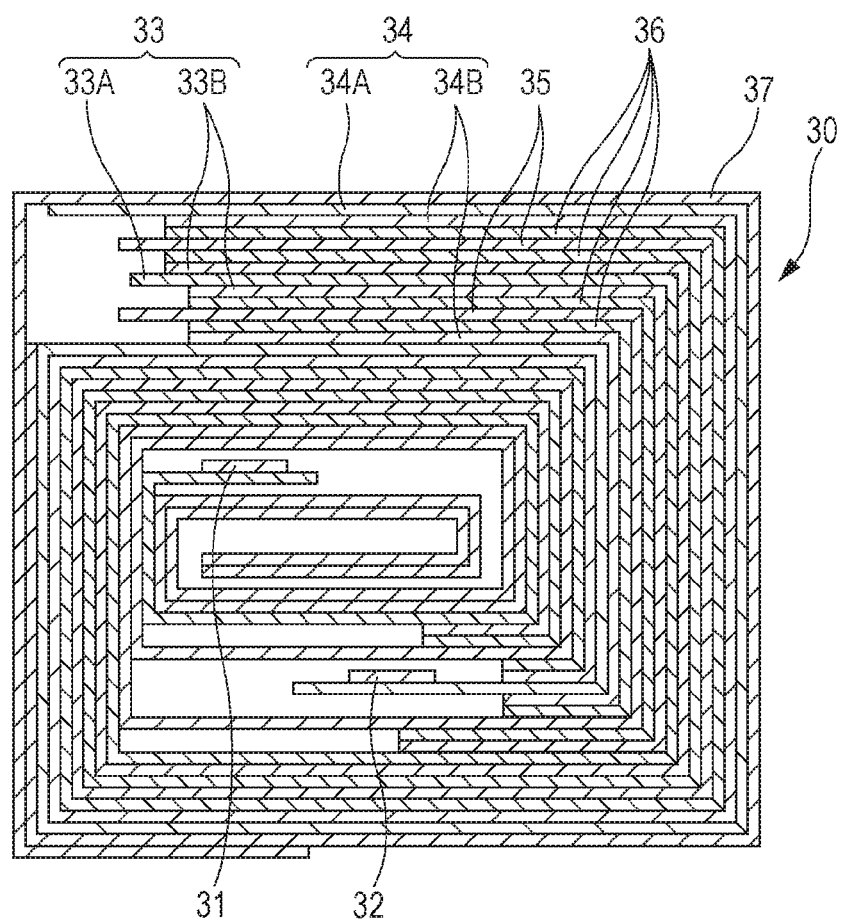
FIG. 2 is a cross-sectional view illustrating a cross-sectional configuration along line I-I in a wound electrode body illustrated in FIG. 1.

A nonaqueous electrolyte battery (battery) according to a first embodiment of the present disclosure will be described. FIG. 1 illustrates an exploded perspective configuration of the nonaqueous electrolyte battery according to the first embodiment of the present disclosure, and FIG. 2 illustrates an enlarged cross-section taken along line I-I in a wound electrode body 30 illustrated in FIG. 1.

In the nonaqueous electrolyte battery, mainly, a wound electrode body 30, to which a positive electrode lead 31 and a negative electrode lead 32 are attached, is accommodated inside a film-shaped exterior packaging member 40. A battery structure using the film-shaped exterior packaging member 40 is also referred to as a laminate film type. The nonaqueous electrolyte battery is, for example, a nonaqueous electrolyte secondary battery capable of being charged and discharged, and for example, a lithium ion secondary battery.

For example, the positive electrode lead 31 and the negative electrode lead 32 are led out from the inside of the exterior packaging member 40 toward the outside. The positive electrode lead 31 is constituted by, for example, a metal material such as aluminum, and the negative electrode lead 32 is constituted by, for example, a metal material such as copper, nickel, and stainless steel. For example, the metal materials have a thin plate shape, or a network shape.

For example, the exterior packaging member 40 has a configuration in which a resin layer is provided on both surfaces of a metal layer constituted by metal foil similar to an aluminum laminate film in which a nylon film, aluminum foil, and a polyethylene film are bonded in this order. As a typical configuration, for example, the exterior packaging member 40 has a lamination structure of an outer resin layer/a metal layer/an inner resin layer. For example, the exterior packaging member 40 has a structure in which outer edge portions of two sheets of rectangular aluminum laminate films are bonded to each other through fusion or with an adhesive in such a manner that the inner resin layer faces the wound electrode body 30. The outer resin layer and the inner resin layer may be constituted by a plurality of layers, respectively.

The metal material that constitutes the metal layer may have a function as a moisture-permeation resistant barrier film, and aluminum (Al) foil, stainless steel (SUS) foil, nickel (Ni) foil, coated iron (Fe) foil, and the like may be used as the metal material. Among these, it is preferable to appropriately use the aluminum foil which is light in weight and is excellent in workability. Particularly, it is preferable to use, for example, annealed aluminum (JIS A8021P-O), (JIS A8079P-O), or (JIS A1N30-O), or the like when considering workability.

Typically, it is preferable that the thickness of the metal layer is set to, for example, 30 μm to 150 μm. In the case of less than 30 μm, material strength tends to decrease. In addition, when exceeding 150 μm, processing is significantly difficult, and the thickness of a laminate film 52 increases, and thus a volume efficiency of the nonaqueous electrolyte battery tends to decrease.

The inner resin layer is a portion that is thermally melted, and parts of the inner resin layer are fused to each other. As the inner resin layer, polyethylene (PE), casted polypropylene (CPP), polyethylene terephthalate (PET), low-density polyethylene (LDPE), high-density polyethylene (HDPE), linear low-density polyethylene (LLDPE), and the like can be used, and a plurality of kinds of the materials may be selected and used.

As the outer resin layer, a polyolefin-based resin, a polyamide-based resin, a polyimide-based resin, polyester, and the like are used when considering beauty in external appearance, toughness, flexibility, and the like. Specifically, nylon (Ny), polyethylene terephthalate (PET), polyethylene naphthalate (PEN), polybutylene terephthalate (PBT), or polybutylene naphthalate (PBN) is used, and a plurality of kinds of these may be selected and used.

An adhesive film 41, which prevents intrusion of external air, is inserted between the exterior packaging member 40, and the positive electrode lead 31 and the negative electrode lead 32. The adhesive film 41 is constituted by a material having adhesiveness with respect to the positive electrode lead 31 and the negative electrode lead 32. Examples of the material include polyolefin resins such as polyethylene, polypropylene, modified polyethylene, and modified polypropylene.

In addition, the exterior packaging member 40 may be constituted by a laminate film having other lamination structures, a polymer film such as polypropylene, a metal film, and the like instead of the aluminum laminate film having the above-described lamination structure.

FIG. 2 illustrates a cross-sectional configuration along line I-I in the wound electrode body 30 illustrated in FIG. 1. The wound electrode body 30 has a configuration in which a strip-shaped positive electrode 33 and a strip-shaped negative electrode 34 are laminated on each other and wound through a strip-shaped separator 35 and an electrolyte 36, and the outermost peripheral portion of the wound electrode body 30 is protected by a protective tape 37.

(Positive Electrode)

For example, the positive electrode 33 includes a both-surface forming portion in which a positive electrode active material layer 33B is provided on both surfaces of a positive electrode current collector 33A having one main surface and the other main surface. In addition, although not illustrated, the positive electrode 33 may include a single-surface forming portion in which the positive electrode active material layer 33B is provided only on a single surface of the positive electrode current collector 33A. For example, the positive electrode current collector 33A is constituted by metal foil such as aluminum foil.

The positive electrode active material layer 33B contains one or more kinds of positive electrode materials capable of intercalating and deintercalating lithium as a positive electrode active material. The positive electrode active material layer 33B may include other materials such as a binding agent and a conductive agent as necessary.

As the positive electrode material, it is preferable to use a lithium cobalt composite oxide which has a layered structure, includes at least lithium and cobalt, and is capable of intercalating and deintercalating lithium. In the case of using the lithium cobalt composite oxide, a discharging curve is flat (a flat region is large), and an average voltage is high. Accordingly, an energy density is large, and a cut-off voltage is high. The lithium cobalt composite oxide having the characteristics is particularly appropriate for the laminate film type gel electrolyte battery of the present disclosure and the like for a cellular use (a portable phone, a smart phone) and the like in which light weight and a high capacity are demanded. On the other hand, for example, in a case of using a nickel-based positive electrode active material such as $LiNiO_2$, thermal stability in a charging state, which decreases at a final stage of a discharging curve (a flat region is short), is not good (stability of a battery is relatively not good), the cut-off voltage is low, and a large amount of gas occurs during high-temperature storage. According to this, the nickel-based positive electrode active material is not appropriate for the laminate film type gel electrolyte battery according to the first embodiment of the present disclosure, and the like.

In addition, as the positive electrode material, in addition to the lithium cobalt composite oxide, other positive electrode active materials capable of intercalating and deintercalating lithium may be used.

As the lithium cobalt composite oxide, specifically, it is preferable to use a lithium cobalt composite oxide having a composition expressed by the following General Formula (Chem. 1).

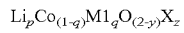  (Chem. 1)

$$Li_pCo_{(1-q)}M1_qO_{(2-y)}X_z$$

(In Formula, M1 represents at least one kind excluding cobalt (Co) among elements selected from Group 2 to Group 15, and X represents at least one kind excluding oxygen (O) among elements in Group 16 and elements in Group 17. p, q, y, and z are values in ranges of $0.9 \leq p \leq 1.1$, $0 \leq q \leq 0.5$, $-0.10 \leq y \leq 0.20$, and $0 \leq z \leq 0.1$.)

More specifically, examples of the lithium cobalt composite oxide expressed by Chem. 1 include $Li_pCoO_2$ (p is the same as described above), $Li_pCo_{0.98}Al_{0.01}Mg_{0.01}O_2$ (p is the same as described above), and the like.

(Coating Particles)

As the positive electrode material capable of intercalating and deintercalating lithium, coating particles, which includes particles of the above-described lithium cobalt composite oxide and a coating layer provided at least on a part of the surface of the lithium cobalt composite oxide particles which become a base material, may be used. When using the coating particles, it is possible to further improve battery characteristics.

The coating layer is provided at least on a part of the surface of the lithium cobalt composite oxide particles which become a base material, and has a composition element or a composition ratio that is different from that of the lithium cobalt composite oxide particles which become the base material.

Existence of the coating layer can be confirmed by examining a concentration variation of a constituent element from a surface of the positive electrode material toward the inside thereof. For example, the concentration variation can be obtained by measuring a composition of the lithium composite oxide particles through auger electron spectroscopy (AES) or secondary ion mass spectrometry (SIMS) while cutting the lithium composite oxide particles through sputtering or the like. In addition, the concentration variation can be measured as follows. The lithium composite oxide particles provided with the coating layer is gradually dissolved in an acidic solution, and a variation in an amount of elution with the passage of time is measured through inductively coupled plasma (ICP) spectrometry or the like.

Examples of the coating layer include a coating layer including an oxide, a transition metal compound, and the like. Specific examples of the coating layer include an oxide that includes at least one of lithium (Li), nickel (Ni), and manganese (Mn), a compound that includes at least one kind selected from the group consisting of nickel (Ni), cobalt (Co), manganese (Mn), iron (Fe), aluminum (Al), magnesium (Mg), and zinc (Zn), oxygen (O), and phosphorus (P), and the like. The coating layer may include a halide such as lithium fluoride, or a chalcogenide other than oxygen.

The coating layer is provided at least at a part of the lithium cobalt composite oxide particles, and may include at least one element M selected from Group 2 to Group 16, and at least one element X selected from phosphorous (P), silicon (Si), germanium (Ge), and a halogen element differently from a main transition metal that substantially constitutes a transition metal included in the lithium cobalt composite oxide particles. In the coating layer, the element M and the element X may exhibit distribution profiles different from each other.

Here, the main transition metal, which constitutes the lithium cobalt composite oxide particles, represents a transition metal of which a ratio is the largest among transition metals that constitute the lithium cobalt composite oxide particles. For example, in a case of composite oxide particles in which an average composition is $LiCo_{0.98}Al_{0.01}Mg_{0.01}O_2$, the main transition metal represents cobalt (Co).

The coating layer is a layer that is formed when the element M and/or the element X is distributed on a surface of transition metal composite oxide particles. The coating layer is a region in which a composition ratio of the element M and/or the element X in the coating layer is higher than a composition ratio of the element M and/or the element X in the transition metal composite oxide particles.

In the coating layer, the element M and the element X which are included in the coating layer may exhibit distribution profiles different from each other in the coating layer. Specifically, it is preferable that the element M and the element X have a difference in uniformity of distribution, and the element M is uniformly distributed on the surface of the transition metal composite oxide particles in comparison to the element X. In addition, it is preferable that the element M is distributed on the surface of the transition metal composite oxide particles in an amount that is more than an amount of the element X. In addition, the distribution profile of the element M and the element X can be confirmed by observing the composite oxide particles having the coating layer by using a scanning electron microscope (SEM) (hereinafter, referred to as an SEM/EDX) provided with an energy dispersive X-ray (EDX) analyzer. In addition, it is also possible to confirm the distribution profile by performing analysis on the surface or the cross-section of the composite oxide particles through time of flight secondary ion mass spectrometry (TOF-SIMS) so as to measure ions including the element M or the element X.

It is preferable that the element M is distributed on the surface of the lithium cobalt composite oxide particles in an approximately uniform manner to form the coating layer. This is because when the surface of the lithium cobalt composite oxide particles is coated with the coating layer including the element M, elution of the main transition metal element included in the lithium cobalt composite oxide particles can be suppressed, or reaction with the electrolyte solution can be suppressed, and thus it is possible to suppress deterioration of the battery characteristics.

As the element M, for example, elements in Group 2 to Group 16 which are used for substitution, addition, coating, and the like with respect to lithium cobaltate ($LiCoO_2$) that has been used for the positive electrode active material in the related art.

On the other hand, it is preferable that the coating layer is formed in such a manner that the element X is scattered on the surface of the lithium cobalt composite oxide particles. This is because it is possible to suppress a decrease in intercalation and deintercalation of lithium due to the coating layer including the element X. In addition, for example, the element X may be unevenly distributed on the surface of the composite oxide particles, or may scatter on the entirety of the surface at a plurality of sites. In addition, the element X may be distributed on the coating layer including the element M in a scattering manner.

In addition, the element X is at least one element selected from phosphorous (P), silicon (Si), germanium (Ge), and a halogen element. These elements are less likely to be solid-soluted in the composite oxide particles, and are capable of suppressing occurrence of a gas due to formation of a stable compound with lithium.

Here, an element ratio of cobalt (Co), the element X, and the element M in the surface of the positive electrode active material can be measured by using a scanning X-ray photoelectron spectroscopy analyzer (ESCA) (QuanteraSXM, manufactured by ULVAC-PHI, Incorporated.). Specifically, a particle sample to be measured is buried in a metal indium specimen, the sample specimen is fixed to a sample stage by using a plate spring, and then measurement is performed. As an X-ray source, monochromatic Al-Kα rays (1486.6 eV) are used, and the measurement can be performed while performing charging compensation with respect to the surface of the measurement sample in an automatic mode by using an argon ion gun and an electron neutralizing gun.

A method of forming the coating layer is not particularly limited. For example, it is possible to use a method in which a raw material of the coating layer is deposited to the lithium cobalt composite oxide particles which become core particles by using an apparatus that applies a compressive shear stress such as mechanofusion, and then a heat treatment is performed to form the coating layer, a method in which a hydroxide that becomes a precursor of the coating layer is deposited to the lithium cobalt composite oxide particles by using neutralization titration, and then a heat treatment is performed to form the coating layer, and the like.

In addition, the coating layer is not limited to the above-described configuration. The coating layer may have a composition element or a composition ration that is different from that of the lithium cobalt composite oxide particles, and at least a part of the surface of the lithium cobalt composite oxide particles may be coated with the coating layer.

(Conductive Agent)

As the conductive agent, for example, a carbon material such as carbon black and graphite is used.

(Binding Agent)

Examples of the binding agent that is used include a resin material such as polyvinylidene fluoride (PVdF), polytetrafluoroethylene (PTFE), polyacrylonitrile (PAN), styrene-butadiene rubber (SBR), and carboxymethyl cellulose (CMC), and at least one kind that is selected from copolymers containing the resin material as a main component, and the like.

(Area Density of Positive Electrode Active Material Layer)

For example, an area density S (mg/cm$^2$) of the positive electrode active material layer 33B is set to 27 mg/cm$^2$ or greater from the viewpoint of a high capacity. In addition, when using the separator having a predetermined structure of the present disclosure, the area density S (mg/cm$^2$) of the positive electrode active material layer 33B is increased, and thus an over-voltage is mitigated. Accordingly, it is possible to improve cycle characteristics.

In addition, in the positive electrode 33, the area density S (mg/cm$^2$) of the positive electrode active material layer 33B represents the total mass of the mass of the positive electrode active material layer 33B per area (1 cm$^2$) on one surface side and the mass of the positive electrode active material layer 33B per area (1 cm$^2$) on the other surface side in the portion (both-surface forming portion) provided with the positive electrode active material layer 33B on the both surfaces of the positive electrode current collector 33A. For example, the area density S (mg/cm$^2$) of the positive electrode active material layer 33B can be measured as follows.

(Method of Measuring Area Density S (mg/cm$^2$) of Positive Electrode Active Material)

After a battery is completely discharged, the battery is disassembled to take out a positive electrode plate (the positive electrode 33). The positive electrode plate is cleaned with a solvent (for example, dimethyl carbonate (DMC)), and is sufficiently dried. A portion (both-surface forming portion) of the positive electrode plate, in which the positive electrode active material layer 33B is formed on both surfaces of the positive electrode current collector 33A, is punched in a predetermined area (cm$^2$) (referred to as a punching area) to measure the mass (mg) (referred to as mass A), and then a portion of the positive electrode plate, in which a mixture layer is not applied to both surfaces, is also punched to measure mass (mg) (referred to as mass B). In addition, the area density is calculated by the following calculation formula.

Area density $S$ (mg/cm$^2$)=(mass $A$−mass $B$)÷punching area          Calculation formula (Negative Electrode)

For example, the negative electrode 34 has a structure provided with a both-surface forming portion in which a negative electrode active material layer 34B is provided on both surfaces of the negative electrode current collector 34A having one main surface and the other main surface. In addition, although not illustrated, the negative electrode 34 may include a single-surface forming portion in which the negative electrode active material layer 34B is provided only on a single surface of the negative electrode current collector 34A. For example, the negative electrode current collector 34A is constituted by metal foil such as copper foil.

The negative electrode active material layer 34B contains one or more kinds of negative electrode materials capable of intercalating and deintercalating lithium as a negative electrode active material. As is the positive electrode active material layer 33B, the negative electrode active material layer 34B may include other materials such as a conductive agent and a binding agent as necessary.

In addition, in the battery, the electrochemical equivalent of the negative electrode material capable of intercalating and deintercalating lithium is greater than the electrochemical equivalent of the positive electrode 33, and theoretically, the electrochemical equivalent of the negative electrode material is set in order for a lithium metal not to precipitate to the negative electrode 34 during charging.

Examples of the negative electrode material capable of intercalating and deintercalating lithium include carbon materials such as hardly graphitizable carbon, easily graphitizable carbon, graphite, pyrolytic carbons, cokes, glass-like carbons, an organic polymer compound fired body, carbon fiber, and activated charcoal. Among these, examples of the cokes include pitch cokes, needle cokes, petroleum cokes, and the like. The organic polymer compound fired body represents a polymer material such as a phenol resin and a furan resin is fired at an appropriate temperature for carbonization, and may be partially classified into the hardly graphitizable carbon and the easily graphitizable carbon. The carbon materials are preferable when considering that a variation in a crystal structure which occurs during charging and discharging is very small, a high charging and discharging capacity can be obtained, and satisfactory cycle characteristics can be obtained. Particularly, the graphite is preferable when considering that the electrochemical equivalent is large and a high energy density can be obtained. In addition, the hardly graphitizable carbon is preferable when considering that excellent cycle characteristics can be obtained. In addition, a carbon material, in which a charging and discharging potential is low, specifically, the charging and discharging potential is close to that of a lithium metal, is preferable when considering that high-energy densification of a battery can be easily realized.

Examples of the negative electrode material capable of intercalating and deintercalating lithium also include a material which is capable of intercalating and deintercalating lithium and which includes at least one kind of a metal element and a metalloid element as a constituent element. This is because when using the material, it is possible to obtain a high energy density. Particularly, it is more preferable to use the material in combination with the carbon material when considering that a high-energy density can be obtained, and excellent cycle characteristics can be obtained. The negative electrode material may be an elementary substance of the metal element or the metalloid element, an alloy thereof, a compound thereof, or a material that includes one or more phases thereof at least at a part. In addition, in the present disclosure, examples of the alloy include an alloy including one or more kinds of metal elements and one or more kinds of metalloid elements in addition to alloy that is constituted by two or more kinds of metal elements. In addition, the alloy may include a non-metal element. The texture of the alloy includes a solid solution, a eutectic crystal (a eutectic mixture), an intermetallic compound, and a texture in which two or more kinds of these textures coexist.

Examples of the metal element or the metalloid element which constitutes the negative electrode material include a metal element or a metalloid element which is capable of forming an alloy in combination with lithium. In addition, the negative electrode material including the element capable of forming an alloy in combination with lithium is referred to as an alloy-based negative electrode. Specific examples of the metal element or the metalloid element, which is capable of forming an alloy in combination with lithium, include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These may be crystalline materials or amorphous materials.

As the negative electrode material, for example, materials including a metal element or a metalloid element in group 4B in a short-period type periodic table as a constituent element are preferable, materials including at least one of silicon (Si) and tin (Sn) as a constituent element are more preferable, and materials including at least silicon is still more preferable. This is because silicon (Si) and tin (Sn) have large capacity of intercalating and deintercalating lithium and may obtain a high energy density. Examples of the negative electrode material, which includes at least one kind of silicon and tin, include an elementary substance of silicon, an alloy or a compound thereof, an elementary substance of tin, an alloy or a compound thereof, and a material that includes one or more kinds of phases of these at least at a part.

Examples of the alloy of silicon include alloys including at least one kind selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a secondary constituent element other than silicon. Examples of the alloy of tin include alloys including at least one kind selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a secondary constituent element other than tin (Sn).

Examples of the compound of tin (Sn) or silicon (Si) include compounds including oxygen (O) or carbon (C). Furthermore, the compounds of tin or silicon may include the above-described secondary constituent element in addition to tin (Sn) or silicon (Si).

Among these, as the negative electrode material, a SnCoC-containing material, which includes cobalt (Co), tin (Sn), and carbon (C) as a constituent element, and in which an amount of carbon is 9.9 mass % to 29.7 mass %, a ratio of cobalt (Co) on the basis of the sum of tin (Sn) and cobalt (Co) is 30 mass % to 70 mass %, is preferable. This is because a high energy density and excellent cycle characteristics can be obtained in this composition range.

The SnCoC-containing material may further include another constituent element as necessary. As another constituent element, for example, silicon (Si), iron (Fe), nickel (Ni), chrome (Cr), indium (In), niobium (Nb), germanium (Ge), titanium (Ti), molybdenum (Mo), aluminum (Al), phosphorus (P), gallium (Ga), or bismuth (Bi) is preferable, and the SnCoC-containing material may include two or more kinds of these constituent elements. This is because the capacity or cycle characteristics can be further improved.

In addition, the SnCoC-containing material has a phase including tin (Sn), cobalt (Co), and carbon (C), and it is preferable that this phase have a low crystalline or amorphous structure. In addition, in the SnCoC-containing material, it is preferable that at least a part of carbon (C) as a constituent element is bonded to a metal element or a metalloid element as another constituent element. The reason for the preference is as follows. A decrease in cycle characteristics is considered to be due to aggregation or crystallization of tin (Sn) or the like, but when carbon (C) is bonded to another element, the aggregation or crystallization can be suppressed.

Examples of the measurement method of examining the bonding state of the element include X-ray photoelectron spectroscopy (XPS). In the XPS, in a case of graphite, a peak of the 1s orbital (C1s) of carbon is shown at 284.5 eV in a device subjected to energy calibration such that a peak of the 4f orbital (Au4f) of a gold atom is obtained at 84.0 eV. In addition, in a case of surface-contaminated carbon, the peak is shown at 284.8 eV. In contrast, in a case where the charge density of the carbon atom increases, for example, in a case where carbon is bonded to the metal element or the metalloid element, the C1s peak is shown in a region below 284.5 eV. That is, in a case where a peak of a synthetic wave of C1s, which is obtained for the SnCoC-containing material, is shown in a region below 284.5 eV, at least a part of the carbon included in the SnCoC-containing material is in a state of being bonded to the metal element or the metalloid element present as another constituent element.

In addition, in the XPS measurement, for example, the C1s peak is used for calibration of an energy axis of a spectrum. Typically, surface-contaminated carbon is present on the surface of the SnCoC-containing material, and thus the C1s peak of the surface-contaminated carbon is set to 284.8 eV, and this is used as an energy reference. In the XPS measurement, a waveform of the C1s peak is obtained as a type that includes both of the peak of the surface-contaminated carbon and the peak of the carbon in the SnCoC-containing material. Therefore, the peak of the surface-contaminated carbon and the peak of the carbon in the SnCoC-containing material are separated from each other, for example, through analysis conducted using commercially available software. In the waveform analysis, the position of a main peak present on the minimum binding energy side is used as an energy reference (284.8 eV).

In addition, examples of the negative electrode material capable of intercalating and deintercalating lithium also include a metal oxide, a polymer compound, and the like which are capable of intercalating and deintercalating lithium. Examples of the metal oxide include lithium titanate ($Li_4Ti_5O_{12}$), iron oxide, ruthenium oxide, molybdenum oxide, and the like. Examples of the polymer compound include polyacetylene, polyaniline, polypyrrole, and the like.

In addition, the negative electrode material capable of intercalating and deintercalating lithium may be a material other than the above-described materials. In addition, two or more kinds of the above-described negative electrode materials may be mixed in an arbitrary combination.

For example, the negative electrode active material layer 34B may be formed by any one of a vapor phase method, a liquid phase method, a thermal spraying method, a firing method, and an application method, and two or more kinds of the methods may be combined. In the case of forming the negative electrode active material layer 34B by the vapor phase method, the liquid phase method, the thermal spraying method, the firing method, or two or more kinds of the methods, it is preferable that alloying of the negative electrode active material layer 34B and the negative electrode current collector 34A occurs at least on a part of an interface thereof. Specifically, it is preferable that at the interface, the constituent element of the negative electrode current collector 34A is diffused to the negative electrode active material layer 34B, the constituent element of the negative electrode active material layer 34B is diffused to the negative electrode current collector 34A, or the constituent elements are diffused to each other. This is because it is possible to suppress fracture due to expansion and shrinkage of the negative electrode active material layer 34B in accordance with charging and discharging, and it is possible to improve electron conductivity between the negative electrode active material layer 34B and the negative electrode current collector 34A.

In addition, examples of the vapor phase method include a physical deposition method or a chemical deposition method. Specific examples of the vapor phase method include a vacuum deposition method, a sputtering method, an ion plating method, a laser ablation method, thermo-chemical vapor deposition (CVD; chemical vapor deposition) method, a plasma chemical vapor deposition method, and the like. As the liquid phase method, a known method such as electroplating and electroless plating can be used. The firing method is a method in which for example, a particle-like negative electrode active material is mixed with a binding agent and the like, the resultant mixture is dispersed in a solvent, and after application, a heat treatment is performed at a temperature that is higher than a melting point of the binding agent and the like. With regard to the firing method, a known method can be used, and examples of the firing method include an atmosphere firing method, a reactive firing method, a hot press firing method, and the like.

(Separator)

Figure 3A:
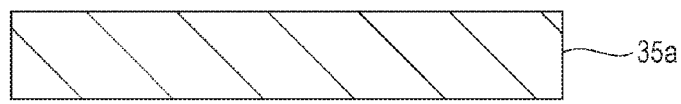
FIG. 3A is a schematic cross-sectional view illustrating a configuration example of a first separator of the present disclosure.
Figure 3B:
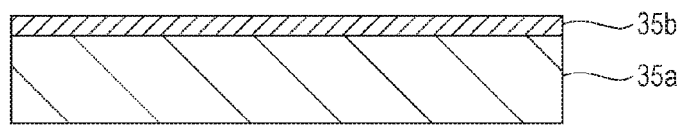
FIG. 3B is a schematic cross-sectional view illustrating a configuration example of a second separator of the present disclosure.

The separator 35 has a configuration including at least a porous film 35a. Examples of the separator 35 include a first separator 35, a second separator 35, and the like. FIG. 3A illustrates a configuration example of the first separator 35. FIG. 3B illustrates a configuration example of the second separator 35.

(First Separator)

As illustrated in FIG. 3A, the first separator 35 is constituted by only the porous film 35a.

(Porous Film)

The porous film 35a has a structure satisfying the following Expressions $$0.04 \leq Ri \leq -0.07L - 0.09 \times S + 4.99$$

$$Ri = \tau^2 L/\varepsilon'$$

$$\varepsilon' = [\{(L \times \varepsilon/100) - Rz \times 0.46/3\}/L] \times 100$$

$$\tau = \{(1.216 \times \varepsilon' Td \times 10^{-4})/L\}^{0.5}$$ (Expressions)

[provided that, Ri: a film resistance (μm), L: a film thickness (μm), τ: a tortuosity factor, T: air permeability (sec/100 cc), d: a pore size (nm), Rz: a surface roughness maximum height (the sum of values of a front surface and a rear surface) (μm), ε: porosity (%), ε': corrected porosity (%), and S: the area density of the positive electrode active material layer (mg/cm$^2$)]

In addition, as described above, the area density S (mg/cm$^2$) of the positive electrode active material layer 33B is 27 mg/cm$^2$ or greater. In addition, in consideration of a range in which the above-described expressions are satisfied, it is preferable that the area density S (mg/cm$^2$) of the positive electrode active material layer 33B is 51 mg/cm$^2$ or less.

The respective parameters in the expressions can be measured as follows. In addition, description has been given to the measurement of the area density of the positive electrode active material layer, and thus the description will be omitted.

(Pore Size d)

The pore size d (nm) is an average pore size that is measured by using non-mercury Palm Polo meter (product name: IEP-200-A) manufactured by SEIKA Corporation.

(Surface Roughness Maximum Height Rz)

The surface roughness maximum height Rz (μm) can be measured in accordance with JIS B0601 by using a nano-scale hybrid microscope (product name: VN-8000) manufactured by KEYENCE Corporation. In addition, the surface roughness maximum height Rz (μm) is the sum of values obtained by performing measurement with respect to two main surfaces (a front surface and a rear surface) of the porous film 35a.

(Porosity ε)

The porosity ε (%) of the porous film 35a can be measured by using a gravimetric method. In this method, 10 sites of the porous film 35a are punched toward a thickness direction of the porous film 35a in a circular shape having a diameter of 2 cm, and the thickness h of the central portion of the punched circular film and the mass w of the film are measured, respectively. In addition, a volume V corresponding to 10 sheets of films and mass W corresponding to 10 sheets of films are calculated by using the thickness h and the mass w, and the porosity ε (%) can be calculated by the following expression.

$$\text{Porosity } \varepsilon \text{ (\%)} = \{(\rho V - W)/(\rho V)\} \times 100$$

Here, ρ represents a density of a material of the porous film 35a.

(Air Permeability T)

The air permeability T (sec/100 cc) is Gurley permeability. The Gurley permeability can be measured in accordance with JIS P8117. The Gurley permeability represents the number of seconds taken for 100 cc of air to pass through a membrane at a pressure of 1.22 kPa.

(Film Thickness L)

The film thickness L is an average film thickness that is obtained by measuring film thickness of two sheets of the porous films 35*a*, which are overlapped to each other at a load of 1 N, at five sites with a probe of ϕ5 mm by using a probe type film thickness meter (DIGITAL GUAGESTAND DZ-501, manufactured by Sony corporation), and by calculating the average of measured values/2.

(Corrected Porosity ε')

The corrected porosity ε' can be calculated from measured values of the film thickness L, the porosity ε, the pore size d, and the surface roughness maximum height Rz by using the following Expression (A).

$$\text{Corrected porosity } \varepsilon' \, (\%) = [\{(L \times \varepsilon/100) - Rz \times 0.46/3\}/L] \times 100 \quad \text{Expression (A)}.$$

[provided that, L: film thickness (μm), ε: porosity (%), Rz: the surface roughness maximum height (the sum of values of a front surface and a rear surface) (μm)]

(Tortuosity Factor τ)

The tortuosity factor τ can be calculated from measured values of the air permeability T, the corrected porosity ε', the pore size d, and the film thickness L by using the following Expression (B).

$$\text{Tortuosity factor } \tau = \{(1.216 \times \varepsilon' T d \times 10^{-4})/L\}^{0.5} \quad \text{Expression (B)}$$

[provided that, L: film thickness (μm), ε': corrected porosity (%), T: air permeability (sec/100 cc)]

(Film Resistance Ri)

The film resistance Ri (μm) can be calculated from measured values of the corrected porosity ε', the film thickness L, and the tortuosity factor τ by using the following Expression (C).

$$Ri = \tau^2 L/\varepsilon' \quad \text{Expression (C)}$$

[provided that, L: film thickness (μm), ε': corrected porosity (%), τ: tortuosity factor]

As the resin material that constitutes the porous film 35*a*, for example, a polyolefin resin such as polypropylene and polyethylene, an acrylic resin, a styrene resin, a polyester resin, a nylon resin, and the like can be used. Among these, it is preferable to use the polyolefin resin (polyolefin film) which tends to form a structure satisfying Expression (1), is excellent in a short-circuit prevention effect, and is capable of improving battery stability due to a shut-down effect. In addition, the porous film 35*a* may have a structure in which a resin layer formed from a resin material is laminated in two or more layers. The porous film 35*a* may be a resin film that is formed by melting and kneading two or more kinds of resin materials. The porous film 35*a* may include an additive such as an antioxidant.

(Method of Preparing Porous Film)

For example, the porous film 35*a* can be prepared as follows. For example, a uniform solution prepared by mixing a polymer such as a polyolefin resin and a solvent (plasticizer) at a high temperature is made into a film by using a T die method, an inflation method, and the like, and the film is stretched. Then, the solvent is extracted and removed by using another volatile solvent, whereby the porous film 35*a* is formed. As the solvent, nonvolatile organic solvents that dissolve a polymer at a high temperature are used alone, or the nonvolatile organic solvents are mixed and used. A phase separation type varies due to a combination of the polymer and the solvent, and thus a porous structure also varies. With regard to a stretching method, sequential biaxial stretching by roll stretching and tenter stretching, simultaneous biaxial stretching by simultaneous biaxial tenter, and the like can be applied. In a manufacturing process, for example, at least any one of an amount of a plasticizer, a stretching ratio, and a stretching temperature is adjusted to obtain the porous film 35*a* having a desired structure satisfying the expressions. In addition, the method of manufacturing the porous film 35*a* is not limited to the above-described example.

(Thickness of Separator)

The thickness Ltotal (=the thickness L of the porous film) of the first separator 35 may be set in an arbitrary manner as long as the thickness is equal to or larger than a thickness with which necessary strength can be maintained. For example, it is preferable to set the thickness Ltotal of the first separator 35 to a thickness with which insulation between the positive electrode 33 and the negative electrode 34 is accomplished for prevention of short-circuiting and the like, ion permeability for an appropriate battery reaction through the first separator 35 is provided, volume efficiency of an active material layer that contributes to the battery reaction in the battery is increased as much as possible. Specifically, it is preferable that the thickness Ltotal of the first separator 35 is, for example, 3 μm to 17 μm.

When the thickness Ltotal of the first separator 35 is greater than $-0.0873S^2 + 6.9788S - 122.66$ [S: area density (mg/cm$^2$) of the positive electrode active material layer] μm, an electrode length becomes short due to an increase in the thickness Ltotal of the first separator 35, and thus a total amount of an active material in the battery decreases. As a result, an effect of a decrease in capacity tends to further increase. According to this, it is more preferable that the thickness Ltotal of the first separator is $-0.0873S^2 + 6.9788S - 122.66$ [S: area density (mg/cm$^2$) of the positive electrode active material layer] μm or less when considering that a volume energy density can be further increased (for example, 300 Wh/L or greater).

(Porosity)

For example, the porosity E of the porous film 35*a* is preferably 20% or greater from the viewpoint of securing satisfactory ion conductivity, is preferably 57% or less from the viewpoint of maintaining physical strength so as to suppress occurrence of short-circuit, and more preferably 25% to 46%.

(Air Permeability)

The air permeability T of the porous film 35*a* is preferably 50 sec/100 cc or greater from the viewpoint of maintaining physical strength so as to suppress occurrence of short-circuit, is preferably 1000 sec/100 cc or less from the viewpoint of securing satisfactory ion conductivity, and more preferably 50 sec/100 cc to 500 sec/100 cc.

(Second Separator)

As illustrated in FIG. 3B, the second separator 35 includes the porous film 35*a* and a surface layer 35*b* that is provided at least on one surface of the porous film 35*a*. In addition, FIG. 3B illustrates an example in which the surface layer 35*b* is provided on one surface of the porous film 35*a*. Although not illustrated, the surface layer 35*b* may be provided on both surfaces of the porous film 35*a*.

(Porous Film 35*a*)

The porous film 35*a* has the configuration as described above.

(Surface Layer)

The surface layer 35b includes a resin material.

(Resin Material)

For example, the resin material may be fibrillated, and may have a three-dimensional network structure in which fibrils are continuously connected to each other.

Examples of the resin material, which is included in the surface layer 35b, include fluorine-containing resins such as polyvinylidene fluoride and polytetrafluoroethylene, fluorine-containing rubbers such as a vinylidene fluoride-tetrafluoroethylene copolymer and an ethylene-tetrafluoroethylene copolymer, a styrene-butadiene copolymer and a hydride thereof, an acrylonitrile-butadiene copolymer and a hydride thereof, an acrylonitrile-butadiene-styrene copolymer and a hydride thereof, a methacrylic ester-acrylic ester copolymer, a styrene-acrylic ester copolymer, an acrylonitrile-acrylic ester copolymer, an ethylene propylene rubber, polyvinyl acetate, cellulose derivatives such as ethyl cellulose, methyl cellulose, hydroxyethyl cellulose, and carboxymethyl cellulose, resins such as polyphenylene ether, polysulfone, polyether sulfone, polyphenylene sulfide, polyetherimide, polyimide, polyamide (particularly, aramid), polyamideimide, polyacrylonitrile, polyvinyl alcohol, polyether, an acrylic resin, and polyester in which at least one of a melting point and a glass transition temperature is 180° C. or higher, thermosetting resins such as a phenol resin and an epoxy resin, and the like.

In addition, the surface layer 35b may further include particles such as inorganic particles and organic particles. In this case, the resin material is contained in the surface layer 35b so as to bind the particles to the surface of the porous film 35a or bind the particles to each other. The particles may be carried in a resin material having a three-dimensional network structure. In this case, it is possible to maintain a state in which the particles are not connected to each other and are dispersed. In addition, the resin material that is not fibrillated may bind the surface of the porous film 35a and the particles. In this case, a higher binding property can be obtained.

(Inorganic Particle)

Examples of the inorganic particles include a metal oxide, a metal oxide hydrate, a metal hydroxide, a metal nitride, a metal carbide, and a metal sulfide which are insulating inorganic particles. As the metal oxide and the metal oxide hydrate, aluminum oxide (alumina, $Al_2O_3$), boehmite ($Al_2O_3H_2O$ or AlOOH), magnesium oxide (magnesia, MgO), titanium oxide (titania, $TiO_2$), zirconium oxide (zirconia, $ZrO_2$), silicon oxide (silica, $SiO_2$) or yttrium oxide (yttria, $Y_2O_3$), zinc oxide (ZnO), and the like can be appropriately used. As the metal nitride, silicon nitride ($Si_3N_4$), aluminum nitride (AlN), boron nitride (BN), titanium nitride (TiN), and the like can be appropriately used. As the metal carbide, silicon carbide (SiC), boron carbide ($B_4C$), and the like can be appropriately used. As the metal sulfide, barium sulfate ($BaSO_4$) and the like can be appropriately used. As the metal hydroxide, aluminum hydroxide ($Al(OH)_3$), and the like can be used. In addition, silicate including porous aluminum silicate such as zeolite ($M_{2/n}O \cdot Al_2O_3 \cdot xSiO_2 \cdot yH_2O$, M represents a metal element, $x \geq 2$, $y \geq 0$), and layered silicate such as talc ($Mg_3Si_4O_{10}(OH)_2$), and a mineral such as barium titanate ($BaTiO_3$) and strontium titanate ($SrTiO_3$) may be used. In addition, lithium compounds such as $Li_2O_4$, $Li_3PO_4$, and LiF also may be used. Carbon materials such as graphite, carbon nanotube, and diamond also may be used. Among these, it is preferable to use alumina, boehmite, talc, titania (particularly, titania having a rutile type structure), silica, or magnesia, and more preferably alumina and boehmite.

These inorganic particles may be used alone or two or more kinds thereof may be mixed and used. The shape of the inorganic particles is not particularly limited, and a spherical shape, a fibrous shape, a needle shape, a squamous shape, a plate shape, a random shape, and the like may be used.

(Organic Particles)

Examples of a material that constitute the organic particles include fluorine-containing resins such as polyvinylidene fluoride and polytetrafluoroethylene, fluorine-containing rubbers such as a vinylidene fluoride-tetrafluoroethylene copolymer and an ethylene-tetrafluoroethylene copolymer, a styrene-butadiene copolymer and a hydride thereof, an acrylonitrile-butadiene copolymer and a hydride thereof, an acrylonitrile-butadiene-styrene copolymer and a hydride thereof, a methacrylic ester-acrylic ester copolymer, a styrene-acrylic ester copolymer, an acrylonitrile-acrylic ester copolymer, an ethylene propylene rubber, polyvinyl acetate, cellulose derivatives such as ethyl cellulose, methyl cellulose, hydroxyethyl cellulose, and carboxymethyl cellulose, resins such as polyphenylene ether, polysulfone, polyether sulfone, polyphenylene sulfide, polyetherimide, polyimide, polyamide such as wholly aromatic polyamide (aramid), polyamideimide, polyacrylonitrile, polyvinyl alcohol, polyether, an acrylic resin, and polyester in which at least one of a melting point and a glass transition temperature is 180° C. or higher and thus high heat resistance is provided, thermosetting resins such as a phenol resin and an epoxy resin, and the like. These materials may be used alone or two or more kinds thereof may be mixed and used. The shape of the organic particles is not particularly limited, and any one of a spherical shape, a fibrous shape, a needle shape, a squamous shape, a plate shape, a random shape, and the like may be used.

For example, the surface layer 35b can be obtained as follows. Specifically, the resin material is added to a dispersion solvent such as N-methyl-2-pyrrolidone to dissolve the resin material, thereby obtaining a resin solution. The resin solution is applied to at least one surface of the porous film 35a, and the porous film 35a is subjected to drying and the like, thereby obtaining the surface layer 35b. In a case where the surface layer 34b contains particles in combination with the resin material, for example, the surface layer 35b can be obtained as follows. Specifically, the resin material and the particles are mixed with each other, and the resultant mixture is added to a dispersion solvent such as N-methyl-2-pyrrolidone to dissolve the resin material, thereby obtaining a resin solution. Then, the resin solution is applied to at least one surface of the porous film 35a, and the porous film 35a is subjected to drying and the like, thereby obtaining the surface layer 35b.

(Thickness of Separator)

The thickness Ltotal of the second separator 35 (the sum of the thickness L of the porous film 35a and the thickness of the surface layer 35b) may be set in an arbitrary manner as long as the thickness is equal to or larger than a thickness with which necessary strength can be maintained. For example, it is preferable to set the thickness Ltotal of the second separator 35 to a thickness with which insulation between the positive electrode 33 and the negative electrode 34 is accomplished for prevention of short-circuiting and the like, ion permeability for an appropriate battery reaction through the second separator 35 is provided, volume efficiency of an active material layer that contributes to the battery reaction in the battery is increased as much as possible. Specifically, it is preferable that the thickness Ltotal of the second separator 35 is, for example, 3 μm to 17 μm.

When the thickness Ltotal of the second separator 35 is greater than $-0.0873S^2+6.9788S-122.66$ [S: area density (mg/cm$^2$) of the positive electrode active material layer] μm, an electrode length becomes short due to an increase in the thickness Ltotal of the second separator 35, and thus a total amount of an active material in the battery decreases. As a result, an effect of a decrease in capacity tends to further increase. According to this, it is more preferable that the thickness Ltotal of the second separator 35 is $-0.0873S^2+6.9788S-122.66$ [S: area density (mg/cm$^2$) of the positive electrode active material layer] μm or less when considering that a volume energy density can be further increased (for example, 300 Wh/L or greater).

(Electrolyte)

The electrolyte 36 includes a nonaqueous electrolyte solution (electrolyte solution) and a polymer compound (matrix polymer compound) that retains the nonaqueous electrolyte solution. For example, the electrolyte 36 is a so-called gel-like electrolyte. The gel-like electrolyte is preferable when considering that high ion conductivity (for example, 1 mS/cm or greater at room temperature) is obtained and liquid leakage is prevented. In addition, the electrolyte 36 may further include particles such as inorganic particles and organic particles. Details of the inorganic particles and the organic particle are the same as described above.

(Nonaqueous Electrolyte Solution)

The nonaqueous electrolyte includes an electrolyte salt and a nonaqueous solvent that dissolves the electrolyte salt.

For example, the electrolyte salt contains one or more kinds of light metal compounds such as a lithium salt. Examples of the lithium salt include lithium hexafluorophosphate (LiPF$_6$), lithium tetrafluoroborate (LiBF$_4$), lithium perchlorate (LiClO$_4$), lithium hexafluoroarsenate (LiAsF$_6$), lithium tetraphenylborate (LiB(C$_6$H$_5$)$_4$), lithium methanesulfonate (LiCH$_3$SO$_3$), lithium trifluoromethanesulfonate (LiCF$_3$SO$_3$), lithium tetrachloroaluminate (LiAlCl$_4$), dilithium hexafluorosilicate (Li$_2$SiF$_6$), lithium chloride (LiCl), lithium bromide (LiBr), and the like. Among these, at least one kind among lithium hexafluorophosphate, lithium tetrafluoroborate, lithium perchlorate, and lithium hexafluoroarsenate is preferable, and lithium hexafluorophosphate is more preferable.

Examples of the nonaqueous solvent include lactone-based solvents such as γ-butyrolactone, γ-valerolactone, δ-valerolactone, and ε-caprolactone, carbonic acid ester-based solvents such as ethylene carbonate, propylene carbonate, butylene carbonate, vinylene carbonate, dimethyl carbonate, ethyl methyl carbonate, and diethyl carbonate, ether-based solvents such as 1,2-dimethoxyethane, 1-ethoxy-2-methoxyethane, 1,2-diethoxyethane, tetrahydrofuran, 2-methyltetrahydrofuran, nitrile-based solvents such as acetonitrile, sulfolane-based solvents, phosphoric acids, phosphoric acid ester solvents, and nonaqueous solvents such as pyrrolidones. Any one kind of the nonaqueous solvents may be used alone, or two or more kinds thereof may be mixed and used.

In addition, as the nonaqueous solvent, it is preferable to use a mixture obtained by mixing cyclic carbonic acid ester and chain carbonic acid ester. It is more preferable to include a compound in which a part or the entirety of hydrogen in cyclic carbonic acid ester and chain carbonic acid ester is fluorinated. As the fluorinated compound, it is preferable to use fluoroethylene carbonate (4-fluoro-1,3-dioxolane-2-one: FEC) or difluoro ethylene carbonate (4,5-difluoro-1,3-dioxolane-2-one: DFEC). This is because even in the case of using the negative electrode 34 including compounds of silicon (Si), tin (Sn), germanium (Ge), and the like as the negative electrode active material, it is possible to improve charging and discharging cycle characteristics. Among these, it is preferable to use difluoro ethylene carbonate as the nonaqueous solvent. This is because an effect of improving cycle characteristics is excellent.

(Polymer Compound)

As the polymer compound, a polymer compound that is compatible with the solvent, and the like can be used. Examples of the polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polystyrene, polycarbonate, and the like. These may be used along or a plurality of kinds thereof may be mixed. Among these, polyacrylonitrile, polyvinylidene fluoride, polyhexafluoropropylene, or polyethylene oxide is preferable. This is because these materials are electrochemically stable.

(Method of Manufacturing Battery)

For example, the nonaqueous electrolyte battery is manufactured by the following three kinds of manufacturing methods (first to third manufacturing methods).

(First Manufacturing Method)

In the first manufacturing method, first, for example, a positive electrode material, a conductive agent, and a binding agent are mixed with other to prepare a positive electrode mixture. The positive electrode mixture is dispersed in a solvent such as N-methyl-2-pyrolidone to prepare a paste-like positive electrode mixture slurry. Next, the positive electrode mixture slurry is applied to both surfaces of the positive electrode current collector 33A, and the solvent is dried. Then, the positive electrode mixture slurry that is applied is compression-molded by roll pressing machine and the like so as to form the positive electrode active material layer 33B, thereby preparing the positive electrode 33. In addition, in a compression-molding process, the compression-molding may be performed by using a roll pressing machine and the like while performing heating as necessary to adjust thickness and density. According to this, it is possible to adjust the area density of the positive electrode active material layer 33B. In this case, the compression-molding may be repeated a plurality of times.

A negative electrode material and a binding agent are mixed with each other to prepare a negative electrode mixture, and the negative electrode mixture is dispersed in a solvent such as N-methyl-2-pyrolidone to prepare a paste-like negative electrode mixture slurry. Next, the negative electrode mixture slurry is applied to both surfaces of the negative electrode current collector 34A, and the solvent is dried. Then, the negative electrode mixture slurry that is applied is compression-molded by a roll pressing machine so as to form the negative electrode active material layer 34B, thereby preparing the negative electrode 34.

Next, a precursor solution including an electrolyte solution, a polymer compound, and a solvent is prepared, and is applied to both surfaces of at least one of the positive electrode 33 and the negative electrode 34. Then, the solvent is evaporated to form the gel-like electrolyte 36. Then, the positive electrode lead 31 is attached to the positive electrode current collector 33A, and the negative electrode lead 32 is attached to the negative electrode current collector 34A. In addition, the configuration may be changed in such a manner that the gel-like electrolyte 36 is formed on both surfaces of the electrodes and the gel-like electrolyte 36 is formed on at least one surface between both surfaces of the separator.

Then, the positive electrode 33 and the negative electrode 34 on which the electrolyte 36 is formed are laminated through the separator 35, and are wound in a longitudinal direction. The protective tape 37 is bonded to the outermost peripheral portion of the resultant wound body to prepare a wound electrode body 30. Finally, for example, the wound electrode body 30 is interposed between two sheets of film-shaped exterior packaging members 40, and then outer edge portions of the exterior packaging members 40 are bonded to each other through thermal fusion and the like, thereby sealing the wound electrode body 30. At this time, the adhesive film 41 is interposed between the positive electrode lead 31 and the negative electrode lead 32, and each of the exterior packaging members 40. According to this, the nonaqueous electrolyte battery illustrated in FIGS. 1 and 2 is obtained. In addition, instead of the wound electrode body 30, an electrode body obtained through lamination of strip-shaped electrode plates and the like is also possible.

(Second Manufacturing Method)

In the second manufacturing method, first, the positive electrode lead 31 is attached to the positive electrode 33, and the negative electrode lead 32 is attached to the negative electrode 34. Then, the positive electrode 33 and the negative electrode 34 are laminated on each other through the separator 35 in which a polymer compound is applied to both surfaces thereof, and are wound. Then, the protective tape 37 is bonded to the outermost peripheral portion of the resultant wound body to prepare a wound body that is a precursor of the wound electrode body 30.

Then, the wound body is interposed between the two sheets of film-shaped exterior packaging members 40. Outer peripheral portions excluding an outer peripheral portion of one side are bonded through thermal fusion and the like, and then the wound body is accommodated inside the exterior packaging member 40 having a bag shape.

Examples of the polymer compound that is applied to the separator 35 include a polymer including vinylidene fluoride as a component, that is, a homopolymer, a copolymer, a multi-component copolymer, and the like. Specifically, polyvinylidene fluoride, a binary copolymer including vinylidene fluoride and hexafluoropropylene as a component, a ternary copolymer including vinylidene fluoride, hexafluoropropylene, and chlorotrifluoroethylene as a component, and the like are suitable. In addition, the polymer compound may include one or more kinds of other polymer compounds in combination with the polymer including vinylidene fluoride as a component.

For example, the polymer compound on the separator 35 may form a porous polymer compound as described below. That is, first, a solution, which is obtained by dissolving the polymer compound in a first solvent composed of a polar organic solvent such as N-methyl-2-pyrrolidone, γ-butyrolactone, N,N-dimethylacetamide, and N,N-dimethyl sulfoxide, is prepared, and the solution is applied to the separator 35. Next, the separator 35 to which the solution is applied is immersed in a second solvent such as water, ethyl alcohol, and propyl alcohol which are compatible with the polar organic solvent and are a poor solvent for the polymer compound. At this time, solvent exchange occurs, and a phase separation accompanied with spinodal decomposition occurs, whereby the polymer compound forms a porous structure. Then, the polymer compound is dried to obtain a porous polymer compound having a porous structure.

Then, an electrolyte solution is prepared, and is injected into the inside of the bag-shaped exterior packaging member 40, and then an opening of the exterior packaging member 40 is sealed through thermal fusion and the like. Finally, the exterior packaging member 40 is heated while being weighted so as to bring the separator 35 into close contact with the positive electrode 33 and the negative electrode 34 through the polymer compound. According to this, the polymer compound is impregnated with the electrolyte solution, the polymer compound gelates, and thus a gel-like electrolyte 36 is formed. According to this, the nonaqueous electrolyte battery illustrated in FIGS. 1 and 2 is obtained. In addition, instead of the wound electrode body 30, an electrode body obtained through lamination of strip-shaped electrode plates and the like is also possible.

(Third Manufacturing Method)

In the third manufacturing method, first, the positive electrode lead 31 is attached to the positive electrode 33, and the negative electrode lead 32 is attached to the negative electrode 34. Then, the positive electrode 33 and the negative electrode 34 are laminated through the separator 35 and are wound. Then, the protective tape 37 is bonded to the outermost peripheral portion of the resultant wound body to prepare a wound body that is a precursor of the wound electrode body 30.

Then, the wound body is interposed between the two sheets of film-shaped exterior packaging members 40. Outer peripheral portions excluding an outer peripheral portion of one side are bonded through thermal fusion and the like, and then the wound body is accommodated inside the exterior packaging member 40 having a bag shape. Then, a composition for an electrolyte, which includes an electrolyte solution, a monomer that is a raw material of the polymer compound, a polymerization initiator, and other materials such as a polymerization inhibitor (as necessary), is prepared. The composition for an electrolyte is injected to the inside of the bag-shaped exterior packaging member 40, and then an opening of the exterior packaging member 40 is sealed through thermal fusion and the like. Finally, the monomer is thermally polymerized to form a polymer compound, thereby forming the gel-like electrolyte 36. According to this, the nonaqueous electrolyte battery illustrated in FIGS. 1 and 2 is obtained. In addition, instead of the wound electrode body 30, an electrode body obtained through lamination of strip-shaped electrode plates and the like is also possible.

The nonaqueous electrolyte battery according to the first embodiment of the present disclosure may be designed in such a manner that an open-circuit voltage (that is, a battery voltage) in a fully charged state per a pair of the positive electrode and the negative electrode is equal to or greater than 4.20 V, 4.25 V, or 4.35 V, and equal to or less than 4.65 V, 4.80 V, or 6.00 V. When the battery voltage is made to be high, it is possible to further increase an energy density. Even in a case where the battery voltage is made to be high, in the embodiment of the present disclosure, since the separator having a predetermined structure is used, it is possible to suppress deterioration in cycle characteristics. For example, in a case where the open-circuit voltage during full charging is 4.25 V or greater, an amount of lithium deintercalated per unit mass increases even in the same positive electrode active material in comparison to a battery in which the open-circuit voltage is 4.20 V. According to this, an amount of the positive electrode active material and an amount of the negative electrode active material are adjusted. As a result, it is possible to obtain a high energy density.

2. Second Embodiment

In a second embodiment, description will be given to an example of a battery pack of a laminate film-type battery (nonaqueous electrolyte battery) provided with the same gel electrolyte layer as in the first embodiment.

The battery pack is a simple battery pack (also referred to as a soft pack). The simple battery pack is embedded in an electronic apparatus such as a smart phone. In the simple battery pack, a battery cell, a protective circuit, and the like are fixed with an insulating tape or the like, a part of the battery cell is exposed, and an output such as a connector to be connected to a main body of the electronic apparatus is provided.

Figure 4:
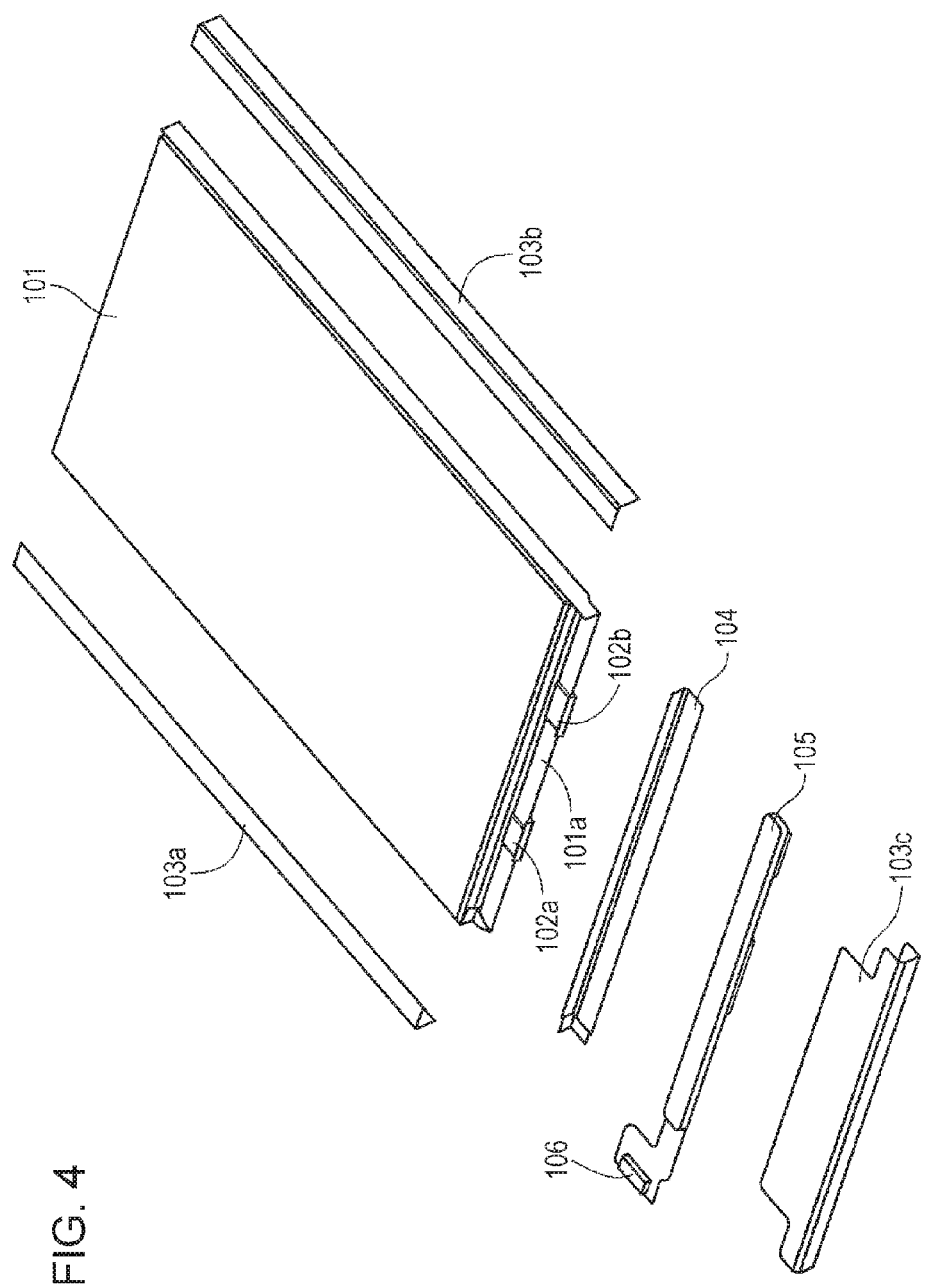
FIG. 4 is an exploded perspective view illustrating a configuration example of a simple battery pack.
Figure 5A:
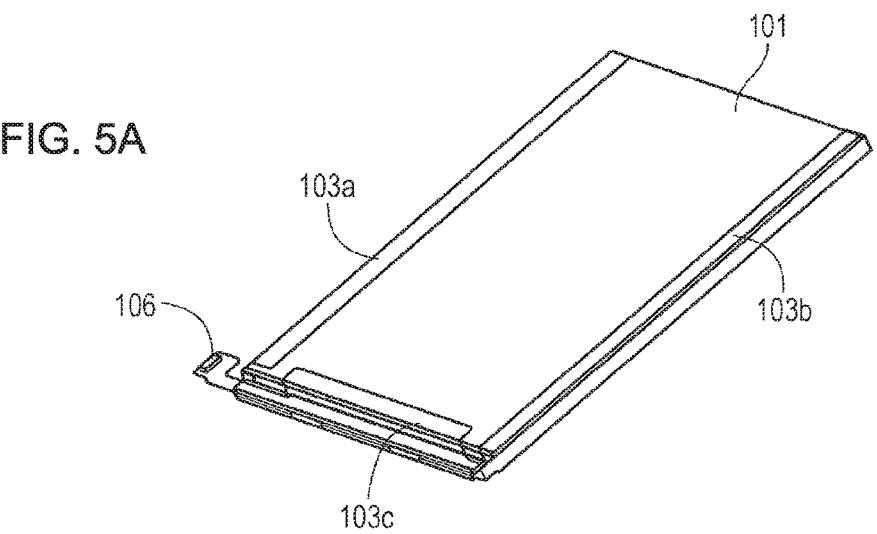
FIG. 5A is a schematic perspective view illustrating the external appearance of the simple battery pack.

An example of a configuration of the simple battery pack will be described. FIG. 4 is an exploded perspective view illustrating a configuration example of the simple battery pack. FIG. 5A is a schematic perspective view illustrating external appearance of the simple battery pack, and FIG. 5B is a schematic perspective view illustrating external appearance of the simple battery pack.

Figure 5B:
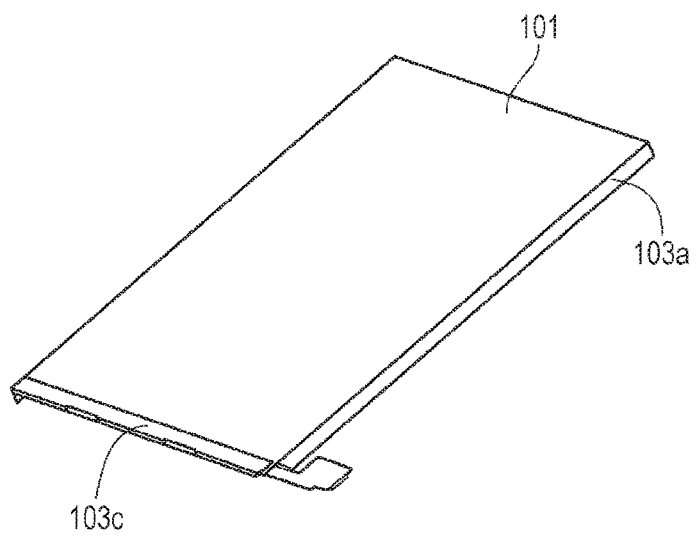
FIG. 5B is a schematic perspective view illustrating the external appearance of the simple battery pack.

As illustrated in FIG. 4, FIG. 5A, and FIG. 5B, the simple battery pack includes a battery cell 101, electrode leads 102a and 102b which are led out from the battery cell 101, insulating tapes 103a to 103c, an insulating plate 104, a circuit substrate 105 in which a protective circuit (protection circuit module (PCM)) is formed, and a connector 106. For example, the battery cell 101 is the same as the nonaqueous electrolyte battery according to the first embodiment.

The insulating plate 104 and the circuit substrate 105 are disposed at a terrace portion 101a that is located at the front end of the battery cell 101, and the lead 102a and the lead 102b which are led from the battery cell 101 is connected to the circuit substrate 105.

The connector 106 for an output is connected to the circuit substrate 105. Members such as the battery cell 101, the insulating plate 104, and the circuit substrate 105 are fixed by bonding the insulating tapes 103a to 103c to predetermined sites.

3. Third Embodiment (Example of Battery Pack)

Figure 6:
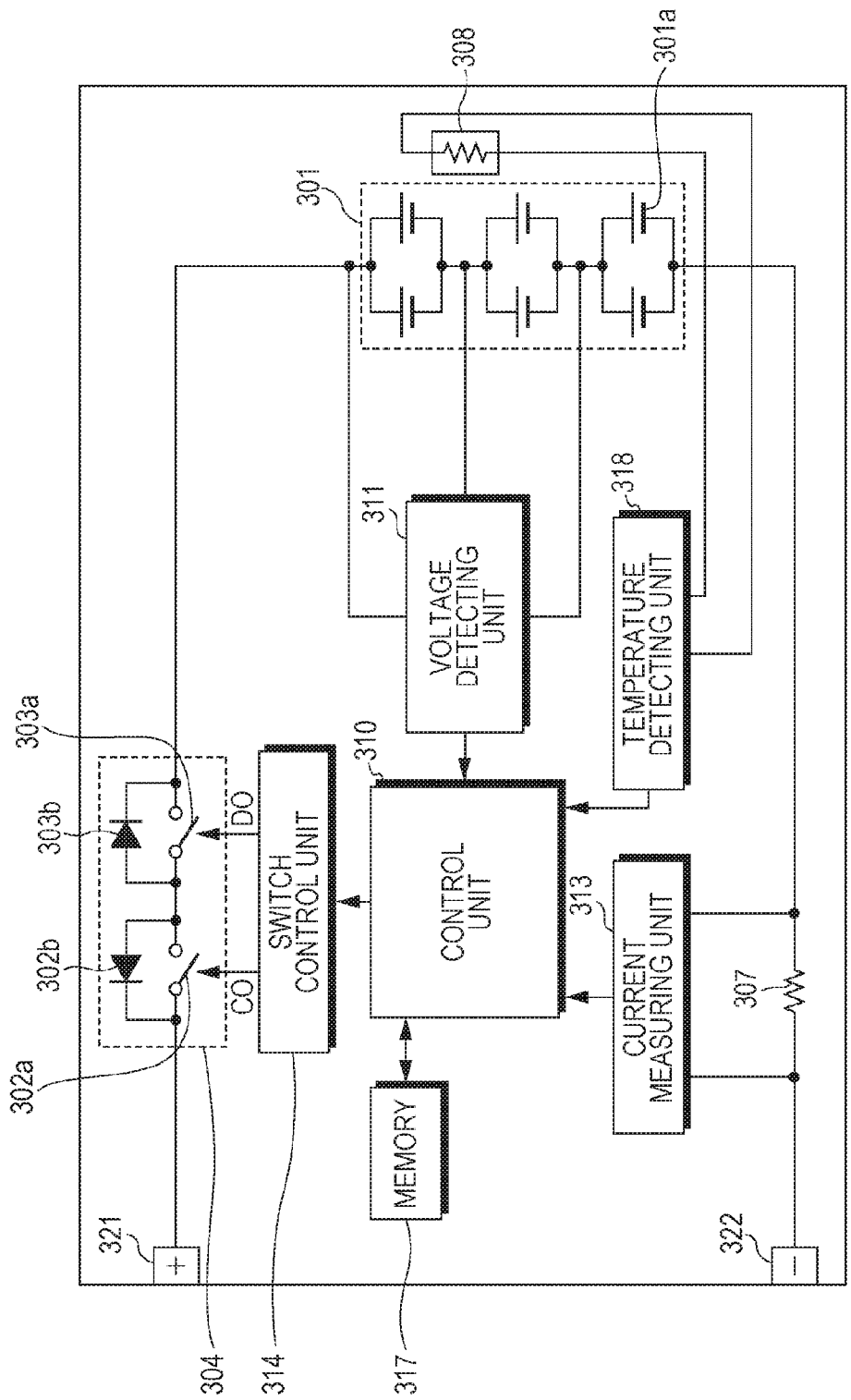
FIG. 6 is a block diagram illustrating a configuration example of a battery pack according to a third embodiment of the present disclosure.

FIG. 6 is a block diagram illustrating an example of a circuit configuration in a case of applying the battery (hereinafter, appropriately referred to as a "secondary battery") according to the first embodiment of the present disclosure to a battery pack. The battery pack includes an assembled battery 301, an exterior casing, a switch unit 304 including a charging control switch 302a and a discharging control switch 303a, a current detecting resistor 307, a temperature detecting element 308, and a control unit 310.

In addition, the battery pack includes a positive electrode terminal 321 and a negative electrode terminal 322. During charging, the positive electrode terminal 321 and the negative electrode terminal 322 are connected to a positive electrode terminal and a negative electrode terminal of a charger, respectively, to perform charging. In addition, during using of an electronic apparatus, the positive electrode terminal 321 and the negative electrode terminal 322 are connected to a positive electrode terminal and a negative electrode terminal of the electronic apparatus, respectively, to perform discharging.

The assembled battery 301 is constructed by connecting a plurality of secondary batteries 301a in series and/or in parallel. Each of the secondary batteries 301a is the secondary battery of the present disclosure. FIG. 6 illustrates a case where six secondary batteries 301a are connected in a type of 2-parallel and 3-series (2P3S) as an example. However, as is the case with n-parallel and m-series (n and m are integers), any connection method is also possible.

The switch unit 304 includes the charging control switch 302a, a diode 302b, the discharging control switch 303a, and a diode 303b, and is controlled by the control unit 310. The diode 302b is has a reverse polarity with respect to a charging current that flows in a direction from the positive electrode terminal 321 to the assembled battery 301, and has a forward polarity with respect to a discharging current that flows in a direction from the negative electrode terminal 322 to the assembled battery 301. The diode 303b has a forward polarity with respect to the charging current and a reverse polarity with respect to the discharging current. In this example, the switch unit 304 is provided on a positive side, but may be provided on a negative side.

The charging control switch 302a is controlled by a charging and discharging control unit in such a manner that when a battery voltage reaches an over-charging detection voltage, the charging control switch 302a is turned off in order for a charging current not to flow through a current path of the assembled battery 301. After the charging control switch 302a is turned off, only discharging is possible through the diode 302b. In addition, the charging control switch 302a is controlled by the control unit 310 in such a manner that when a large current flows during charging, the charging control switch 302a is turned off so as to block a charging current flowing through the current path of assembled battery 301.

The discharging control switch 303a is controlled by the control unit 310 in such a manner that when the battery voltage reaches an over-discharging detection voltage, the discharging control switch 303a is turned off in order for a discharging current not to flow through the current path of the assembled battery 301. After the discharging control switch 303a is turned off, only charging is possible through the diode 303b. In addition, the discharging control switch 303a is controlled by the control unit 310 in such a manner that when a large current flows during discharging, the discharging control switch 303a is turned off so as to block the discharging current flowing through the current path of the assembled battery 301.

For example, the temperature detecting element 308 is a thermistor, is provided in the vicinity of the assembled battery 301, measures a temperature of the assembled battery 301, and supplies a measured temperature to the control unit 310. The voltage detecting unit 311 measures the voltage of the assembled battery 301 and each of the secondary batteries 301a which constitutes the assembled battery 301, A/D converts the measured voltage, and supplies the converted voltage to the control unit 310. The current measuring unit 313 measures a current by using the current detecting resistor 307, and supplies the measured current to the control unit 310.

The switch control unit 314 controls the charging control switch 302a and the discharging control switch 303a of the switch unit 304 on the basis of the voltage and the current which are input from the voltage detecting unit 311 and the current measuring unit 313, respectively. When any voltage of the secondary batteries 301a is equal to or lower than the over-charging detection voltage or the over-discharging detection voltage, or when a large current flows in a drastic manner, the switch control unit 314 transmits a control signal to the switch unit 304 to prevent over-charging, over-discharging, and over-current charging and discharging.

Here, for example, in a case where the secondary battery is a lithium ion secondary battery, the over-charging detection voltage is set to, for example, 4.20 V±0.05 V, and the over-discharging detection voltage is set to, for example, 2.4 V±0.1 V.

As the charging and discharging switch, for example, a semiconductor switch such as MOSFET can be used. In this case, a parasitic diode of the MOSFET functions as the diodes 302b and 303b. In a case where a P-channel type FET is used as the charging and discharging switch, the switch control unit 314 supplies control signals DO and CO to gates of the charging control switch 302a and the discharging control switch 303a, respectively. In the case of the P-channel type, the charging control switch 302a and the discharging control switch 303a are turned on by a gate potential that is lower than a source potential by a predetermined value. That is, in a typical charging and discharging operation, the control signals CO and DO are set to a low level, and the charging control switch 302a and the discharging control switch 303a are set to an ON-state.

In addition, for example, during over-charging or over-discharging, the control signals CO and DO are set to a high level, and the charging control switch 302a and the discharging control switch 303a are set to an OFF-state.

A memory 317 is constituted by a RAM or ROM, for example, an erasable programmable read only memory (EPROM) that is a nonvolatile memory, and the like. In the memory 317, a numerical value that is calculated by the control unit 310, an internal resistance value of the battery in an initial state of each of the secondary batteries 301a which is measured at a step of a manufacturing process, and the like are stored in advance, and appropriate rewriting is also possible. In addition, a full-charging capacity of the secondary battery 301a is stored in the memory 317, and thus, for example, a residual capacity can be calculated in combination with the control unit 310.

In the temperature detecting unit 318, a temperature is measured by using the temperature detecting element 308, and charging and discharging control is performed during abnormal heat generation or correction is performed for calculation of a residual capacity.

4. Fourth Embodiment

For example, the battery according to the first embodiment of the present disclosure, and the battery pack according to the second embodiment and the third embodiment may be used to be mounted on an apparatus such as an electronic apparatus, an electrically driven vehicle, and an electrical storage device, or for supply of electric power thereto.

Examples of the electronic apparatus include a notebook computer, a portable digital assistant (PDA), a cellular phone, a cordless phone handset, a video movie, a digital still camera, an electronic book, an electronic dictionary, a music player, a radio, a headphone, a gaming machine, a navigation system, a memory card, a pacemaker, a hearing aid, an electric tool, an electric shaver, a refrigerator, an air conditioner, a television, a stereo, a water heater, a microwave oven, a dishwasher, a washing machine, a dryer, an illumination apparatus, a toy, a medical apparatus, a robot, a road conditioner, a signal apparatus, and the like.

In addition, examples of the electrically driven vehicle include a railway vehicle, a golf cart, an electrically driven cart, an electric vehicle (including a hybrid car), and the like, and the batteries are used as a driving power supply or an auxiliary power supply of the vehicles.

Examples of the electrical storage device include power supplies for electrical storage of buildings starting from a house, a power generating facility, and the like.

Hereinafter, among the above-described application examples, specific examples of the electrical storage system using an electrical storage device to which the batteries of the present disclosure are applied will be described.

As the electrical storage system, for example, the following configuration may be exemplified. A first electrical storage system is an electrical storage system in which an electrical storage device is charged by a power generating device that performs power generation from renewable energy. A second electrical storage system is an electrical storage system that is provided with an electrical storage device and supplies electric power to an electronic apparatus that is connected to the electrical storage device. A third electrical storage system is an electronic apparatus to which electric power is supplied from an electrical storage device. This electrical storage system is executed as a system that realizes efficient power supply in cooperation with an external power supply network.

In addition, a fourth electrical storage system is an electrically driven vehicle provided with a conversion device to which electric power is supplied from an electrical storage device and which converts the electric power to a driving force of a vehicle, and a control device that performs information processing relating to vehicle control on the basis of information relating to the electrical storage device. A fifth electrical storage system is a power system which is provided with an power information transmitting and receiving unit that transmits and receives a signal to and from other apparatuses through a network, and performs charging and discharging control of the above-described electrical storage device on the basis of the information that is received by the transmitting and receiving unit. A sixth electrical storage system is a power system to which electric power is supplied from the above-described electrical storage device or which supplies electric power from a power generating device or a power network to the electrical storage device. Hereinafter, the electrical storage system will be described.

(4-1) Electrical Storage System in House as Application Example

Figure 7:
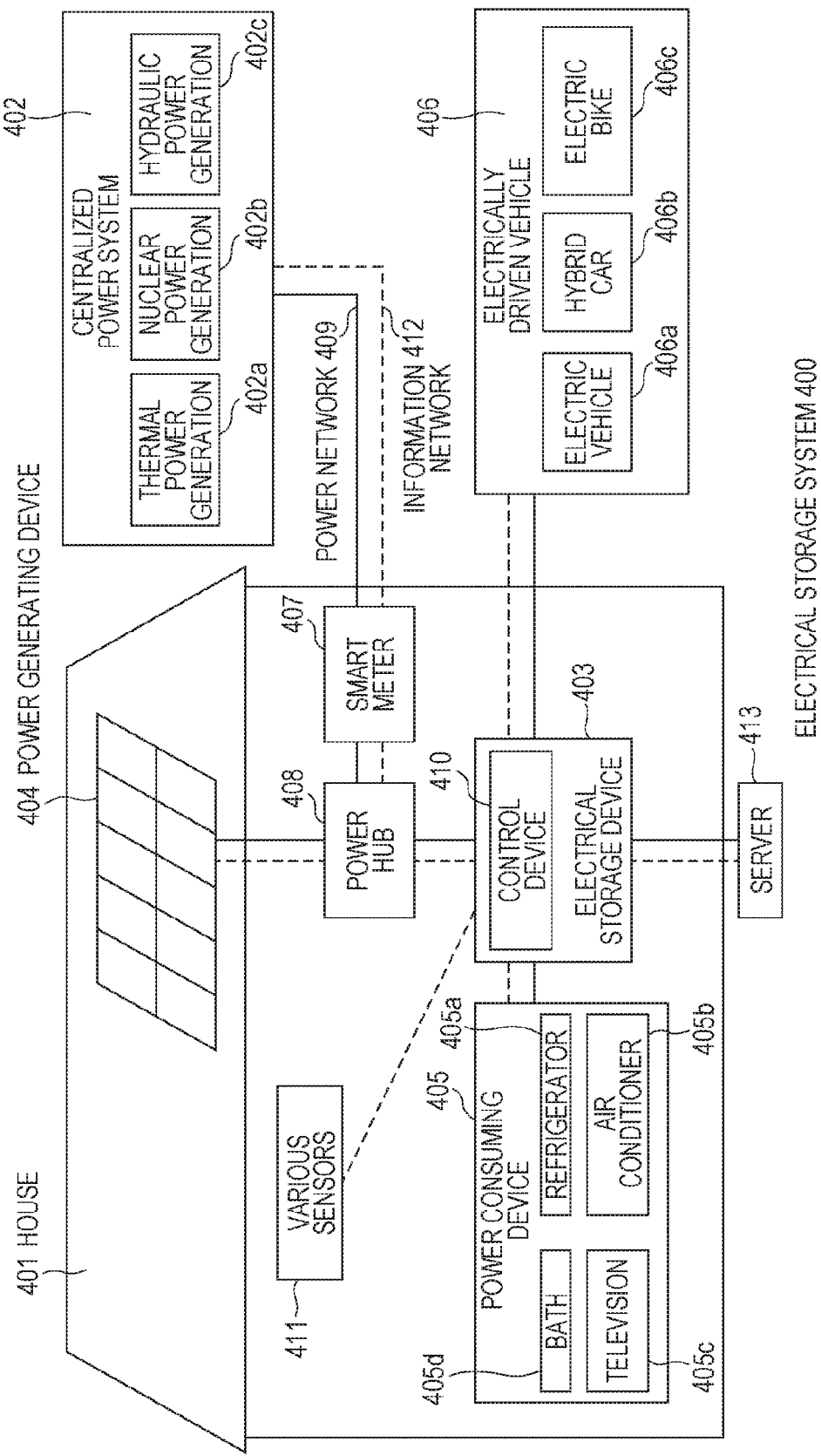
FIG. 7 is a schematic view illustrating an example in which the battery of the present disclosure is applied to an electrical storage system for a house.

An example in which an electrical storage device using the battery of the present disclosure is applied to an electrical storage system for a house will be described with reference to FIG. 7. For example, in an electrical storage system 400 for a house 401, electric power is supplied to an electrical storage device 403 from a centralized power system 402 such as a thermal power generation 402a, a nuclear power generation 402b, a hydraulic power generation 402c through a power network 409, an information network 412, a smart meter 407, a power hub 408, and the like. In addition, electric power from an independent power supply such as an in-house power generating device 404 is supplied to the electrical storage device 403. The electric power supplied to the electrical storage device 403 is stored. Electric power that is used in the house 401 is supplied by using the electrical storage device 403. The same electrical storage system may also be used with respect to a building without limitation to the house 401.

The power generating device 404, power consuming devices 405, the electrical storage device 403, a control device 410 that controls respective devices, the smart meter 407, and sensors 411 that acquire various pieces of information are provided to the house 401. The respective devices are connected to each other by the power network 409 and the information network 412. As the power generating device 404, a solar cell, a fuel cell, or the like is used, and generated power is supplied to the power consuming devices 405 and/or the electrical storage device 403. Examples of the power consuming devices 405 include a refrigerator 405a, an air conditioner 405b, a television 405c, a bath 405d, and the like. In addition, examples of the power consuming devices 405 include an electrically driven vehicle 406. Examples of the electrically driven vehicle 406 include an electric vehicle 406a, a hybrid car 406b, and an electric bike 406c.

The battery of the present disclosure is applied with respect to this electrical storage device 403. For example, the battery of the present disclosure may be configured by the above-described lithium ion secondary battery. The smart meter 407 has a function of measuring the amount of commercial power used and of transmitting the amount that is measured to a power company. The power network 409 may be any one of a DC power supply type, an AC power supply type, and non-contact power supply type, or a combination thereof.

Examples of the various sensors 411 include a motion sensing sensor, a luminance sensor, an object sensing sensor, a power-consumption sensor, a vibration sensor, a contact sensor, a temperature sensor, an infrared sensor, and the like. Information acquired by the various sensors 411 is transmitted to the control device 410. Weather conditions, conditions of human, or the like is grasped by the information transmitted from the sensors 411, and the power consuming devices 405 are automatically controlled. Therefore, it is possible to make the energy-consumption minimal. In addition, the control device 410 may transmit information related to the house 401 to an external power company or the like through the Internet.

Processes such as divergence of power lines and DC-AC conversion are performed by the power hub 408. Examples of a communication method of the information network 412 connected to the control device 410 include a method using a communication interface such as a universal asynchronous receiver-transmitter (UART) (transmission and reception circuit for asynchronous serial communication), and a method using a sensor network compliant to a wireless communication standard such as Bluetooth, ZigBee, and Wi-Fi. The Bluetooth method is applied to multimedia communication and may perform one-to-multi connection communication. The ZigBee uses a physical layer of institute of electrical and electronics engineers (IEEE) 802.15.4. IEEE 802.15.4 is the name of a short-range wireless network standard called a personal area network (PAN) or wireless (W) PAN.

The control device 410 is connected to an external server 413. The server 413 may be managed by any one of the house 401, the power company, and a service provider. Examples of information that is transmitted to and received from the server 413 include power-consumption information, life pattern information, power rates, weather information, disaster information, and information related to power transaction. These kinds of information may be transmitted to and received from in-house power consuming devices (for example, a television receiver), but may be transmitted to and received from devices (for example, cellular phones) positioned at the outside of the house. For example, these kinds of information may be displayed on apparatuses such as a television receiver, a cellular phone, a personal digital assistant (PDA), and the like which have a display function.

The control device 410 that controls each unit includes a central processing unit (CPU), a random access memory (RAM), a read only memory (ROM), and the like, and is accommodated in the electrical storage device 403 in this example. The control device 410 is connected to the electrical storage device 403, the in-house power generating device 404, the power consuming devices 405, the various sensors 411, and the server 413 through the information network 412, and has, for example, a function of adjusting the amount of commercial power used and an amount of power generation. Furthermore, in addition to this function, the control device 410 may have a function of performing power transaction in a power market, and the like.

As described above, generated electric power of the in-house power generating device 404 (photovoltaic generation and wind power generation) as well as the centralized power system 402 such as the thermal generation 402a, the nuclear power generation 402b, and the hydraulic power generation 402c may be stored in the electrical storage device 403. Therefore, even when the generated electric power of the in-house power generating device 404 varies, it is possible to make an amount of power that is transmitted to the outside uniform, or it is possible to control discharging as much as necessary. For example, a method of use described below may be considered. Specifically, the electric power that is obtained from the photovoltaic generation is stored in the electrical storage device 403, and inexpensive midnight power is also stored in the electrical storage device 403 at night, and then the electric power that is stored in the electrical storage device 403 is discharged to be used in a period of time at which a rate is expensive in the day time.

In addition, in this example, an example in which the control device 410 is accommodated in the electrical storage device 403 has been described, but the control device 410 may be accommodated in the smart meter 407, or may be configured independently. Furthermore, the electrical storage system 400 may be used in a plurality of homes as targets in regard to an apartment house, or may be used in a plurality of detached houses as targets.

(4-2) Electrical Storage System in Vehicle as Application Example

Figure 8:
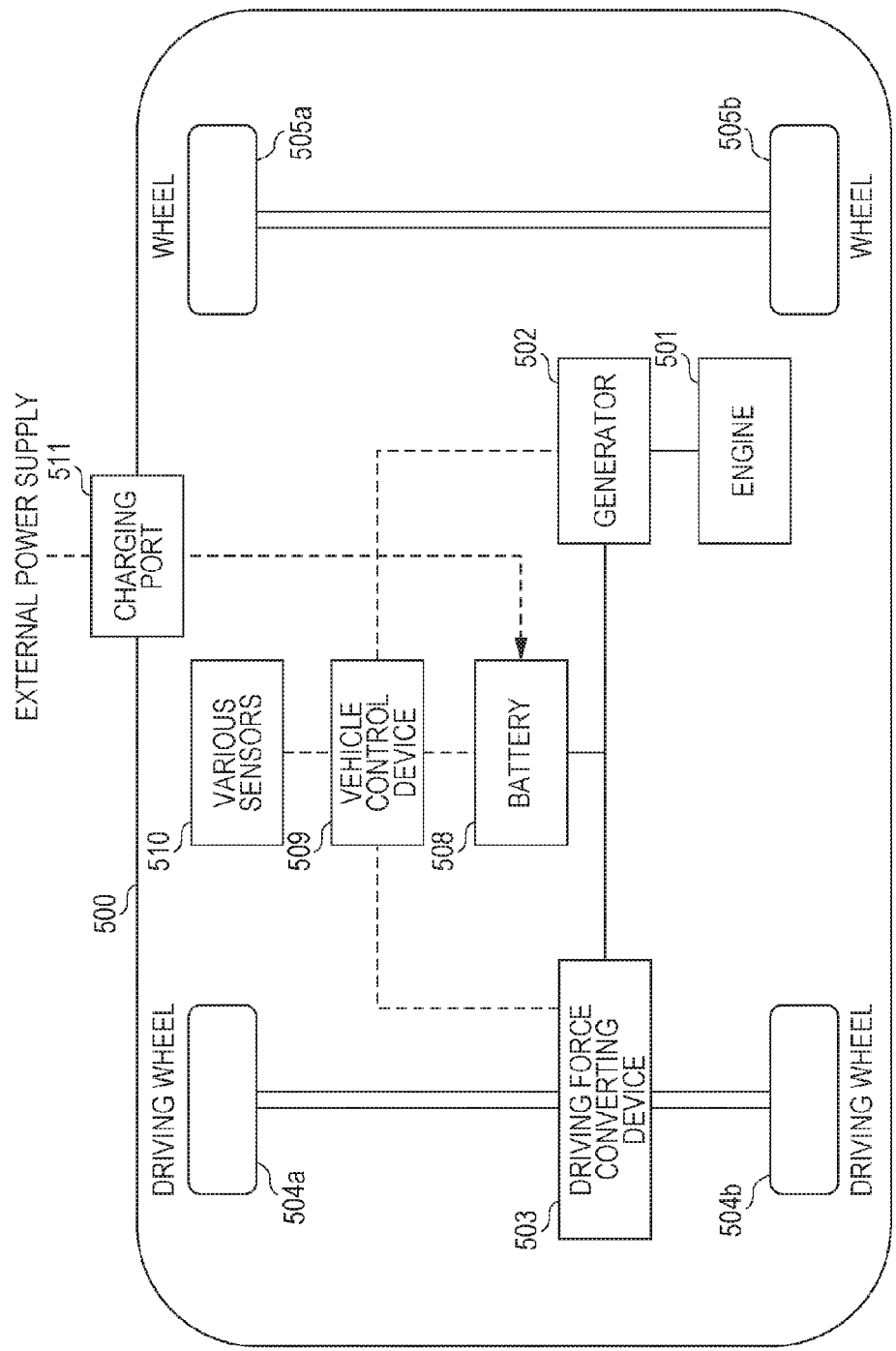
FIG. 8 is a schematic view illustrating an example of a configuration of a hybrid car that employs a series hybrid system to which the present disclosure is applied.
Figure 9:
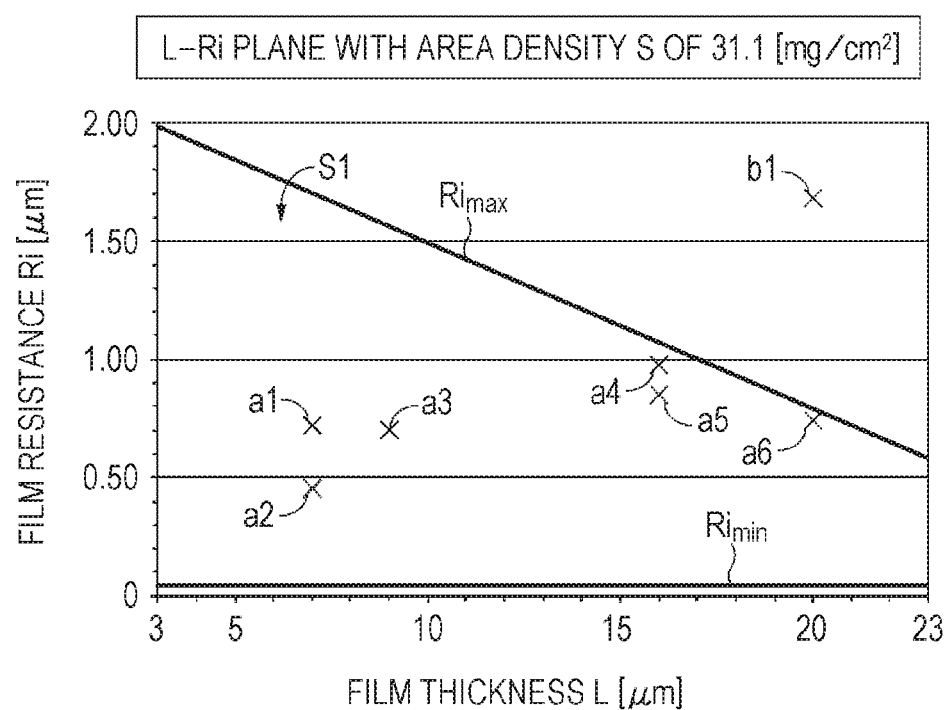
FIG. 9 is a graph obtained by plotting measured values of separators in Example 1-1 to Example 1-6, and Comparative Example 1-1 on an L-Ri coordinate plane with an area density (S) of 31.1 mg/cm$^2$.
Figure 10:
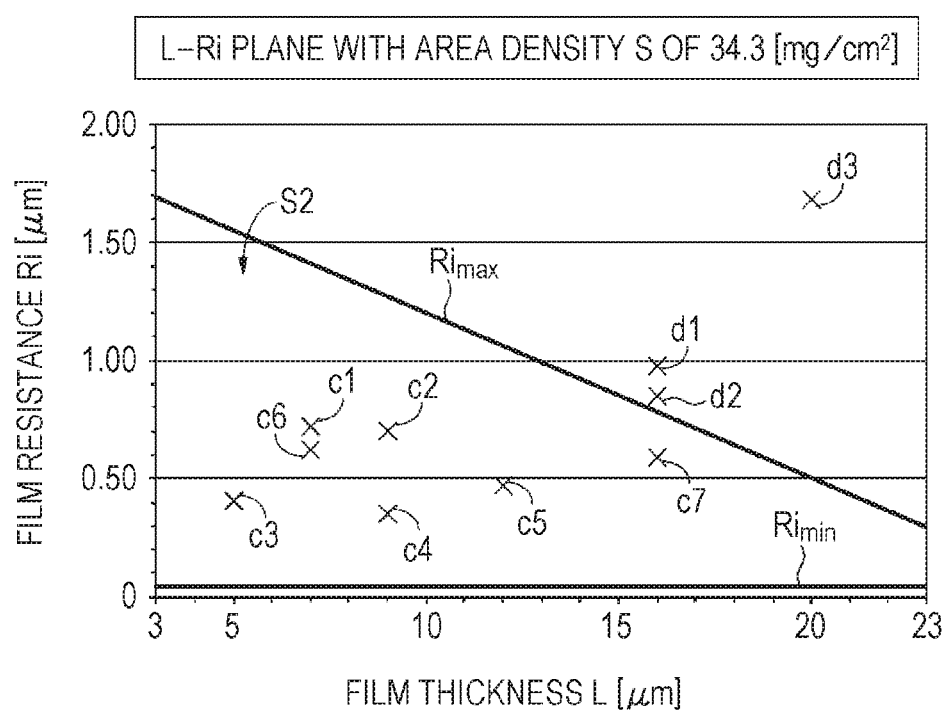
FIG. 10 is a graph obtained by plotting measured values of separators in Example 2-1 to Example 2-11, and Comparative Example 2-1 to Comparative Example 2-3 on an L-Ri coordinate plane with an area density (S) of 34.3 mg/cm$^2$.
Figure 11:
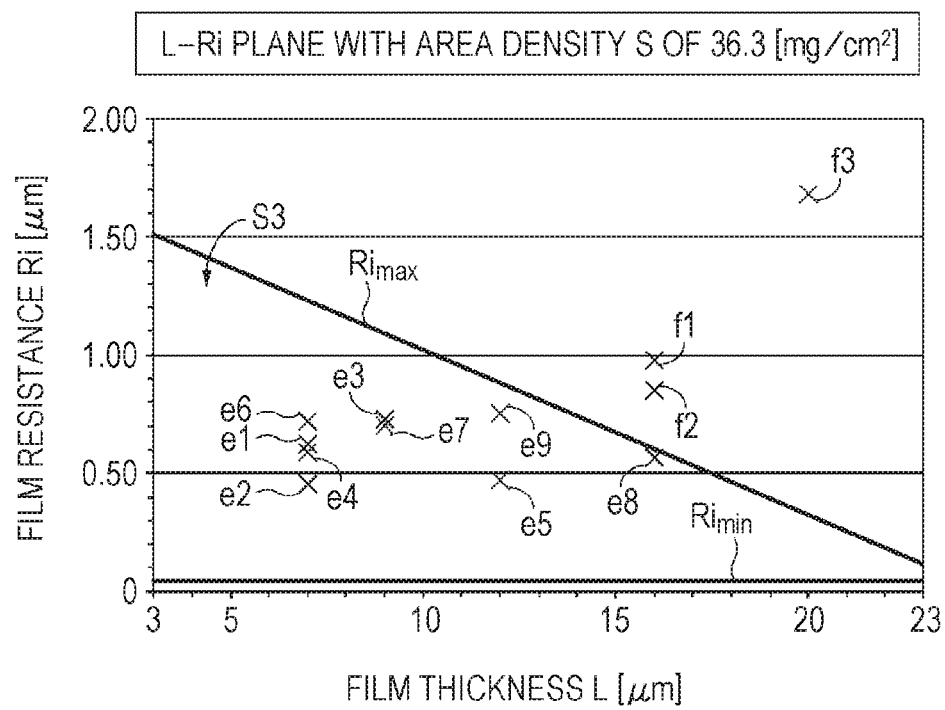
FIG. 11 is a graph obtained by plotting measured values of separators in Example 3-1 to Example 3-10, and Comparative Example 3-1 to Comparative Example 3-3 on an L-Ri coordinate plane with an area density (S) of 36.3 mg/cm$^2$.
Figure 12:
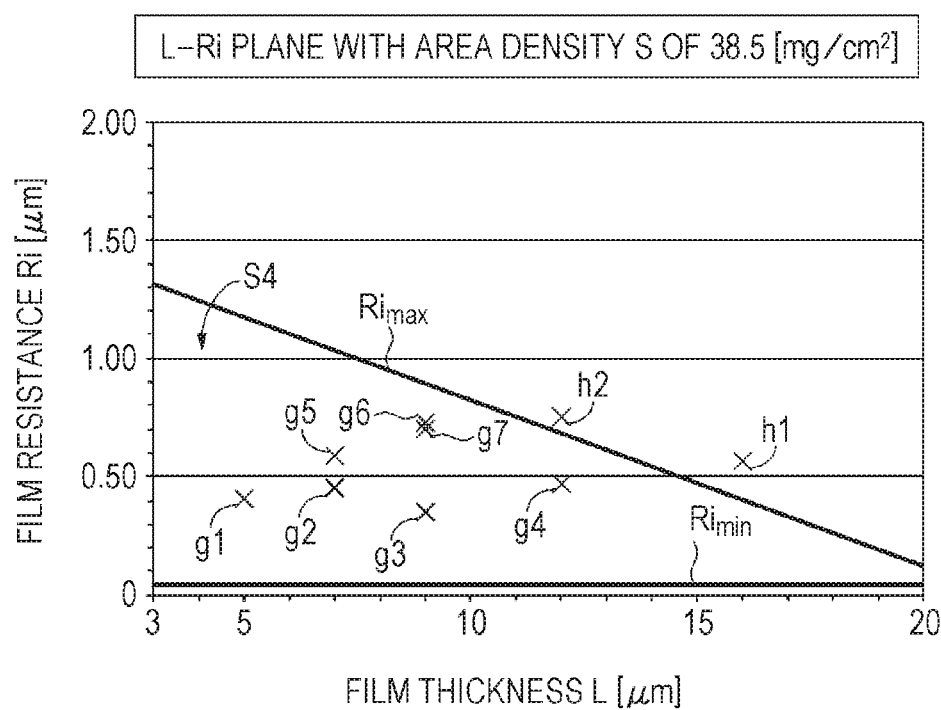
FIG. 12 is a graph obtained by plotting measured values of separators in Example 4-1 to Example 4-7, and Comparative Example 4-1 and Comparative Example 4-2 on an L-Ri coordinate plane with an area density (S) of 38.5 mg/cm$^2$.
Figure 13:
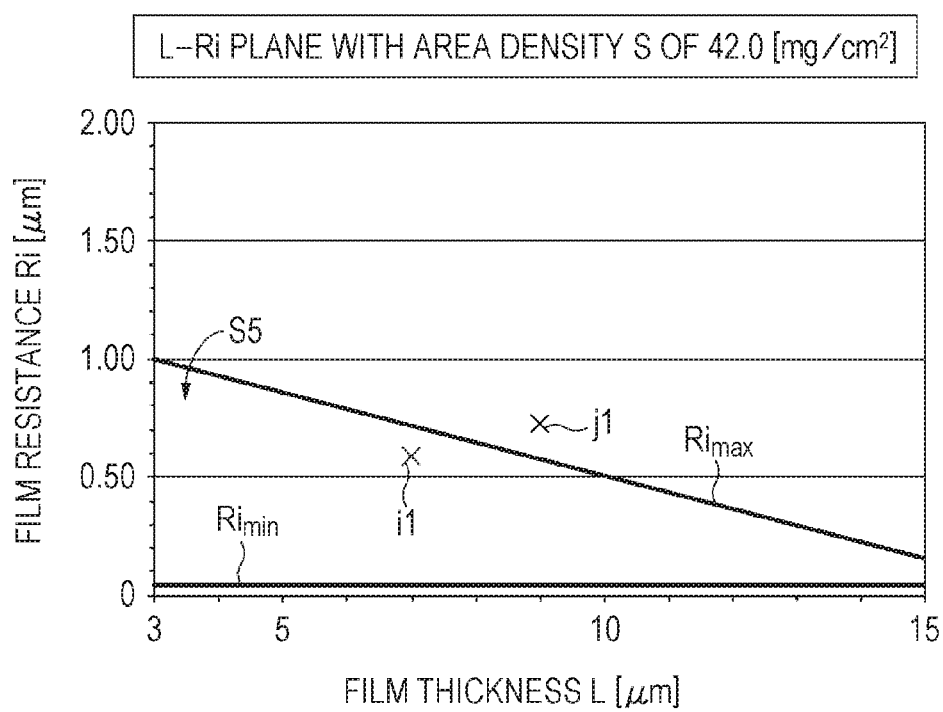
FIG. 13 is a graph obtained by plotting measured values of separators in Example 5-1 and Comparative Example 5-1 on an L-Ri coordinate plane with an area density (S) of 42.0 mg/cm$^2$.

An example in which the present disclosure is applied to an electrical storage system for a vehicle will be described with reference to FIG. 8. FIG. 8 schematically illustrates an example of a configuration of a hybrid car that employs a series hybrid system to which the present disclosure is applied. The series hybrid system is a vehicle that travels with an electric power-driving force converting device by using electric power generated by a generator moved by an engine or the electric power that is temporarily stored in a battery.

In the hybrid vehicle 500, an engine 501, a generator 502, an electric power-driving force converting device 503, a driving wheel 504a, a driving wheel 504b, a wheel 505a, a wheel 505b, a battery 508, a vehicle control device 509, various sensors 510, and a charging port 511 are mounted. The above-described battery of the present disclosure is applied to the battery 508.

The hybrid vehicle 500 travels using the electric power-driving force converting device 503 as a power source. An example of the electric power-driving force converting device 503 is a motor. The electric power-driving force converting device 503 operates by electric power of the battery 508, and the torque of the electric power-driving force converting device 503 is transferred to the driving wheels 504a and 504b. In addition, the electric power-driving force converting device 503 may be applicable to an AC motor or a DC motor by using DC-AC conversion or invert conversion (AC-DC conversion) as necessary. The various sensors 510 control the engine speed or the opening degree of a throttle valve (not illustrated) (throttle opening degree) through the vehicle control device 509. Examples of the various sensors 510 include a speed sensor, an acceleration sensor, an engine speed sensor, and the like.

A torque of the engine 501 may be transferred to the generator 502, and electric power generated by the generator 502 using the torque may be stored in the battery 508.

When the hybrid vehicle 500 is decelerated by a brake mechanism (not illustrated), a resistance force during the deceleration is added to the electric power-driving force converting device 503 as a torque, and regenerated electric power that is generated by the electric power-driving force converting device 503 due to the torque is stored in the battery 508.

When the battery 508 is connected to an external power supply located at the outside of the hybrid vehicle 500, electric power may be supplied to the battery 508 from the external power supply by using the charging port 511 as an input port and the battery 508 may store the electric power that is supplied.

Although not illustrated, an information processing device that performs information processing related to vehicle control on the basis of information related to the secondary battery may be provided. Examples of the information processing device include an information processing device that performs display of a residual amount of the battery on the basis of information about the residual amount of the battery, and the like.

In addition, hereinbefore, description has been made with respect to the series hybrid car that travels with a motor by using electric power generated by a generator moved by an engine or the electric power that is temporarily stored in a battery as an example. However, the present disclosure may be effectively applied to a parallel hybrid car that uses both the output of the engine and the output of the motor as driving sources, and utilizes three types of traveling using the engine only, traveling using the motor only, and traveling using the engine and motor by appropriately changing these types. In addition, the present disclosure may be effectively applied with respect to a so-called electrically driven vehicle that travels using driving by a driving motor only without using the engine.

EXAMPLES

Hereinafter, the present disclosure will be described in detail with reference to examples. In addition, a configuration of the present disclosure is not limited to the following examples.

Example 1-1

[Preparation of Positive Electrode]

A positive electrode was prepared as follows. 91 parts by mass of a positive electrode active material ($LiCo_{0.98}Al_{0.01}Mg_{0.01}O_2$), 6 parts by mass of graphite as a conductive agent, and 3 parts by mass of polyvinylidene fluoride as a binding agent were mixed with each other to prepare a positive electrode mixture. In addition, the positive electrode mixture was dispersed in a N-methyl-2-pyrrolidone as a solvent to make the positive electrode mixture have a paste shape. Next, the positive electrode mixture paste that was obtained was uniformly applied to both surface of strip-shape aluminum foil having a thickness of 12 μm as a positive electrode current collector, and was dried. After drying, compression-molding was performed by using a roller pressing machine to form a positive electrode active material layer. In addition, area density adjustment of the positive electrode active material layer was performed by adjusting a thickness and a density in the compression-molding process while performing heating as necessary. In Example 1, the area density of the positive electrode active material layer was adjusted to 31.1 mg/cm$^2$. In addition, an aluminum lead was welded to a portion of the positive electrode current collector in which the positive electrode active material layer was not formed to form a positive electrode terminal, thereby obtaining the positive electrode.

[Preparation of Negative Electrode]

A negative electrode was prepared as follows. 90 parts by mass of graphite as a negative electrode active material, and 10 parts by mass of polyvinylidene fluoride as a binding agent were mixed with each other to prepare a negative electrode mixture. In addition, the negative electrode mixture was dispersed in N-methyl-2-pyrrolidone as a solvent to make the negative electrode mixture have a paste shape. Next, the negative electrode mixture paste that was obtained was uniformly applied to both surfaces of strip-shaped copper foil which becomes a negative electrode current collector and has a thickness of 8 μm, and was dried. After drying, compression-molding was performed by using a roller pressing machine to form a negative electrode active material layer. In addition, a nickel lead was welded to a portion of the negative electrode current collector in which the negative electrode active material layer was not formed to form a negative electrode terminal, thereby obtaining the negative electrode.

[Preparation of Separator]

As a separator, the following polyethylene film was prepared. A raw material resin obtained by mixing 2 parts by mass of ultrahigh molecular weight polyethylene having a weight-average molecular weight (Mw) of $2.5 \times 10^6$, and 13 parts by mass of polyethylene having a weight-average molecular weight (Mw) of $2.4 \times 10^5$, and liquid paraffin in an amount in accordance with a desired structure were mixed with each other to prepare a polyethylene composition solution.

Next, 0.125 parts by mass of 2,5-di-t-butyl-p-cresol, and 0.25 parts by mass of tetrakis[(methylene)-3-(3,5-di-t-butyl-4-hydroxylphenyl)-propionate)]methane as an antioxidant were added to 100 parts by mass of the polyethylene composition solution. The mixed solution was put into a stirrer-equipped autoclave and was stirred at 200° C. for 90 minutes, thereby obtaining a uniform solution.

The solution was extruded from a T-die by using an extruder having a diameter of 45 mm, and was drawn by using a cooling roll, thereby forming a gel-like sheet.

The sheet that was obtained was set in a biaxial stretching machine, and simultaneous biaxial stretching was performed at a stretching temperature and in a stretching ratio in accordance with a desired structure.

The stretched film that was obtained was washed with methylene chloride to extract and remove the liquid paraffin that remained, and was dried, thereby obtaining a polyethylene film (separator) having a desired structure (the film thickness: 7 μm, the surface roughness maximum height: 2 μm, the porosity before correction: 30%, the corrected porosity: 25.6%, the air permeability: 250 sec/100 cc, the pore size: 24 nm, the tortuosity factor: 1.6, and the film resistance: 0.72 μm).

[Formation of Gel Electrolyte Layer]

A gel electrolyte layer was formed on the positive electrode and the negative electrode as follows.

First, 80 g of dimethyl carbonate (DMC), 40 g of ethylene carbonate (EC), 40 g of propylene carbonate (PC), 9.2 g of $LiPF_6$, and 0.8 g of vinylene carbonate (VC) were mixed with each other to prepare a solution (electrolyte solution).

Next, 10 g of a copolymer of polyvinylidene fluoride (PVdF) and hexafluoropropylene (HFP) (copolymerization weight ratio of PVdF:HFP=97.3) was added to the solution. The resultant mixture was uniformly dispersed in a homogenizer, and was heated and stirred at 75° C. until the mixture became colorless and transparent, thereby obtaining an electrolyte solution.

Next, the electrolyte solution that was obtained was uniformly applied to both surfaces of the positive electrode and the negative electrode by a doctor blade method, respectively. Then, the positive electrode and the negative electrode, to which the electrolyte solution was applied, was left for one minute in a dryer of which an inside temperature was maintained at 40° C. for gelation of the electrolyte solution, thereby forming a gel electrolyte layer having a thickness of approximately 8 μm was formed on the both surfaces of the positive electrode and the negative electrode, respectively.

[Assembly of Battery]

A battery was assembled as follows. The positive electrode and the negative electrode which were prepared as described above were used. The strip-shaped positive electrode in which the gel electrolyte layer was formed on both surfaces thereof, and the strip-shaped negative electrode in which the gel electrolyte layer was formed on both surfaces thereof were laminated through the separator to obtain a laminated body. The laminated body was wound in a longitudinal direction thereof to obtain a wound electrode body.

Next, the wound electrode body was interposed between moisture-proofing exterior packaging films (laminate films) in which nylon with a thickness of 25 μm, aluminum with a thickness of 40 μm, and polypropylene with a thickness of 30 μm were laminated in this order from the outermost layer, and the outer peripheral portions of the exterior packaging films were thermally fused under decompression for sealing, thereby closing the wound electrode body was closed in the exterior packaging film. In addition, at this time, the positive electrode terminal and the negative electrode terminal were inserted into a sealed portion of the exterior packaging films, and a polyolefin film was disposed at a portion at which the exterior packaging films and the positive electrode terminal and the negative electrode terminal come into contact with each other.

Finally, electrode elements were heated in a state of being sealed in the exterior packaging films. In this manner, thereby obtaining a laminate film type gel electrolyte battery (with a battery size having a thickness of 4 4 mm, a width of 65 mm, a height of 71 mm, and a battery volume of $2.03 \times 10^{-5}$ L).

Example 1-2 to Example 1-6, and Comparative Example 1-1

A laminate film type gel electrolyte battery was obtained in the same manner as in Example 1-1 except that a separator having a film thickness, a surface roughness maximum height, porosity before correction, corrected porosity, air permeability, a pore size, a tortuosity factor, and a film resistance in Table 1 was prepared.

Example 2-1 to Example 2-11, and Comparative Example 2-1 to Comparative Example 2-3

The area density of the positive electrode active material layer was adjusted to 34.3 mg/cm$^2$. A separator having a film thickness, a surface roughness maximum height, porosity before correction, corrected porosity, air permeability, a pore size, a tortuosity factor, and a film resistance in Table 1 was prepared. A laminated film type gel electrolyte battery was obtained in the same manner as in Example 1-1 except for the above-described configuration.

Example 3-1 to Example 3-3, Example 3-5 to Example 3-10, and Comparative Example 3-1 to Comparative Example 3-3

The area density of the positive electrode active material layer was adjusted to 36.3 mg/cm$^2$. A separator having a film thickness, a surface roughness maximum height, porosity before correction, corrected porosity, air permeability, a pore size, a tortuosity factor, and a film resistance in Table 1 was prepared. A laminated film type gel electrolyte battery was obtained in the same manner as in Example 1-1 except for the above-described configuration.

Example 3-4

The area density of the positive electrode active material layer was adjusted to 36.3 mg/cm$^2$. A separator having a film thickness, a surface roughness maximum height, porosity before correction, corrected porosity, air permeability, a pore size, a tortuosity factor, and a film resistance in Table 1 was prepared.

Next, polyvinylidene fluoride (PVdF) was dissolved in N-methyl-2-pyrrolidone to prepare a solution. The solution was applied to both surfaces of the separator. Then, the separator was immersed in water, and was dried. According to this, a porous polymer compound having a porous structure was formed on both surfaces of the separator.

The positive electrode and the negative electrode, which were prepared in the same manner as in the first embodiment, were brought into close contact with each other through the separator in which the porous polymer compound was formed on both surfaces thereof. Then, winding was performed in a longitudinal direction and a protective tape was bonded to the outermost peripheral portion of the resultant wound body, thereby preparing a wound electrode body.

The wound electrode body was interposed between parts of an exterior packaging member, and three sides of the exterior packaging member were thermally fused. In addition, as the exterior packaging member, a moisture-proofing aluminum laminate film having a structure, in which a nylon film with a thickness of 25 μm, aluminum foil with a thickness of 40 μm, and a polypropylene film with a thickness of 30 μm were laminated in this order from the outermost layer, was used.

Then, an electrolyte solution was injected to the inside of the exterior packaging member, and the remaining one side was thermally fused under decompression for sealing. In addition, as the electrolyte solution, an electrolyte solution, which was prepared by mixing 17 g of ethyl methyl carbonate (EMC), 34 g of ethylene carbonate (EC), 34 g of diethyl carbonate (DEC), 14 g of $LiPF_6$, and 0.8 g of vinylene carbonate (VC), was used. In addition, the electrolyte solution was interposed between iron plates and was heated therein so as to make the porous polymer compound swell, thereby obtaining a gel-shaped electrolyte. According to this, a laminate film type gel electrolyte battery having the same size as in Example 1-1 was obtained.

Example 4-1 to Example 4-4, Example 4-7, and Comparative Example 4-1

The area density of the positive electrode active material layer was adjusted to 38.5 mg/cm². A separator having a film thickness, a surface roughness maximum height, porosity before correction, corrected porosity, air permeability, a pore size, a tortuosity factor, and a film resistance in Table 1 was prepared. A laminated film type gel electrolyte battery was obtained in the same manner as in Example 1-1 except for the above-described configuration.

Example 4-5 to Example 4-6, and Comparative Example 4-2

The area density of the positive electrode active material layer was adjusted to 38.5 mg/cm². A separator having a film thickness, a surface roughness maximum height, porosity before correction, corrected porosity, air permeability, a pore size, a tortuosity factor, and a film resistance in Table 1 was prepared. A laminated film type gel electrolyte battery was obtained in the same manner as in Example 3-4 except for the above-described configuration.

Example 5-1 and Comparative Example 5-1

The area density of the positive electrode active material layer was adjusted to 42.0 mg/cm². A separator having a film thickness, a surface roughness maximum height, porosity before correction, corrected porosity, air permeability, a pore size, a tortuosity factor, and a film resistance in Table 1 was prepared. A laminated film type gel electrolyte battery was obtained in the same manner as in Example 3-4 except for the above-described configuration.

In the above-described Example 1-1 to Example 5-1, and Comparative Example 1-1 to Comparative Example 5-1, the pore size d (nm) of the separator, the surface roughness maximum height Rz (µm), the film thickness L (µm), the porosity ε (%), the air permeability T (sec/100 cc), the corrected porosity ε' (%), the tortuosity factor τ, the area density S (mg/cm²) of the positive electrode active material layer, and the film resistance Ri (µm) were measured as follows.

(Pore Size d)

The pore size d (nm) is an average pore size that was measured by using non-mercury Palm Polo meter (product name: IEP-200-A) manufactured by SEIKA Corporation.

(Surface Roughness Maximum Height Rz)

The surface roughness maximum height Rz (µm) was measured in accordance with JIS B0601 by using a nano-scale hybrid microscope (product name: VN-8000) manufactured by KEYENCE Corporation. The surface roughness maximum height is the sum of values obtained by performing measurement with respect to two main surfaces of the porous film (polyethylene film (separator)), respectively.

(Porosity ε)

The porosity ε (%) of the separator can be measured by using a gravimetric method. In the method, 10 sites of the separator are punched toward a thickness direction of the separator in a circular shape having a diameter of 2 cm, and the thickness h of the central portion of the punched circular film and the mass w of the film are measured, respectively. In addition, a volume V corresponding to 10 sheets of films and mass W corresponding to 10 sheets of films are obtained by using the thickness h and the mass w, and the porosity ε (%) can be calculated by the following expression.

Porosity ε (%)={(ρV−W)/(ρV)}×100

Here, ρ represents a density of a material of the separator.

(Air Permeability T)

The air permeability T (sec/100 cc) of the separator is Gurley permeability. The Gurley permeability can be measured in accordance with JIS P8117. The Gurley permeability represents the number of seconds taken for 100 cc of air to pass through a membrane at a pressure of 1.22 kPa.

(Film Thickness L)

The film thickness L is an average film thickness that is obtained by measuring film thickness of two sheets of the porous films (a polyethylene film (separator)), which are overlapped to each other at a load of 1 N, at five sites with a probe of φ5 mm by using a probe type film thickness meter (DIGITAL GUAGESTAND DZ-501, manufactured by Sony corporation), and by calculating the average of measured values/2.

(Corrected Porosity ε')

The corrected porosity ε' (%) was calculated from measured values of the film thickness, the porosity, the pore size, and the surface roughness maximum height by using the following Expression (A).

Corrected porosity ε' (%)=[{(L×ε/100)−Rz×0.46/3}/L]×100  Expression (A).

[provided that, L: film thickness (µm), ε: porosity (%), Rz: the surface roughness maximum height (the sum of values of a front surface and a rear surface) (µm)]

(Tortuosity Factor τ)

The tortuosity factor τ was calculated from measured values of the air permeability, the corrected porosity, the pore size, and the film thickness by using the following Expression (B).

Tortuosity factor τ={(1.216×ε'×Td×10⁻⁴)/L}⁰·⁵  Expression (B)

[provided that, L: film thickness (µm), ε': corrected porosity (%), T: air permeability (sec/100 cc)]

(Area Density S of Positive Electrode Active Material Layer)

After a battery was completely discharged, the battery was disassembled to take out a positive electrode plate. The positive electrode plate was cleaned with a solvent (DMC: dimethyl carbonate), and was sufficiently dried. A portion (both-surface forming portion) of the positive electrode plate, in which the positive electrode active material layer was formed on both surfaces of the positive electrode current collector, was punched in a predetermined area (punching area) to measure the mass (mg) (referred to as mass A), and then a portion of the positive electrode plate, in which a mixture layer was not applied to both surfaces, was also punched to measure mass (mg) (referred to as mass B). In addition, the area density was calculated by the following calculation formula.

Area density (mg/cm²)=(mass A−mass B)÷punching area  Calculation formula (Film Resistance Ri)

The film resistance Ri (µm) was calculated from measured values of the corrected porosity ε' (%), the film thickness L (µm), and the tortuosity factor τ by using the following Expression (C).

Ri=τ²L/ε'  Expression (C).

[provided that, L: film thickness (μm), ε': corrected porosity (%), τ: tortuosity factor]

(Evaluation of Battery: Cycle Test)

The following cycle test was performed with respect to each of the batteries which were prepared to obtain a capacity retention rate (cycle retention rate). CC-CV charging (constant-current and constant-voltage charging) was performed for five hours with a current of 0.5 C at a predetermined charging voltage (voltage shown in Table 1) at 23° C., and after a pause for three hours, discharging was performed with a discharging current of 0.5 C to a voltage of 3.0 V. The operation was repeated twice. Second discharging was set as a first cycle, and a discharging capacity at this time was set as an initial discharging capacity of the battery. Charging and discharging were repeated under the same conditions, and [capacity after 500 cycles/initial discharging capacity]×100 (%) was set as a cycle retention rate. In addition, 1 C is a current value with which a theoretical capacity is discharged (or charged) in one hour. 0.5 C is a current value with which the theoretical capacity is discharged (or charged) in two hours.

(Battery Evaluation: Measurement of Volume Energy Density)

The initial discharging capacity (mAh) obtained by the cycle test was multiplied by an average discharging voltage (V), and then the resultant value was divided by a battery volume, thereby obtaining an energy density (Wh/L).

Measurement results of Example 1-1 to Example 5-1, and Comparative Example 1-1 to Comparative Example 5-1 are shown in Table 1.

TABLE 1

| | Positive electrode | | Separator | | | | | | | | Evaluation | | | | |
|---|---|---|---|---|---|---|---|---|---|---|---|---|---|---|---|
| | Area density of positive electrode active material layer S [mg/cm²] | Film thickness L [μm] | Surface roughness maximum height Rz [μm] | Porosity before correction ε [%] | Corrected porosity ε' [%] | Air permeability T [sec/100 cc] | Pore size d [nm] | tortuosity factor τ | Film resistance Ri [μm] | Volume energy density [Wh/L] | Voltage [V] | Rate [C] | The number of cycles | Cycle retention rate [%] |
| Example 1-1 | 31.1 | 7 | 2 | 30 | 25.6 | 250 | 24 | 1.6 | 0.72 | 374 | 4.2 | 0.5 | 500 | 90 |
| Example 1-2 | | 7 | 2.5 | 38 | 32.5 | 140 | 27 | 1.5 | 0.45 | 374 | 4.2 | 0.5 | 500 | 95 |
| Example 1-3 | | 9 | 2 | 33 | 29.6 | 280 | 21 | 1.5 | 0.70 | 326 | 4.2 | 0.5 | 500 | 85 |
| Example 1-4 | | 16 | 1.5 | 35 | 33.6 | 450 | 18 | 1.4 | 0.98 | 200 | 4.2 | 0.5 | 500 | 80 |
| Example 1-5 | | 16 | 2 | 38 | 36.1 | 500 | 14 | 1.4 | 0.85 | 200 | 4.2 | 0.5 | 500 | 78 |
| Example 1-6 | | 20 | 2 | 45 | 43.5 | 230 | 27 | 1.3 | 0.74 | 182 | 4.2 | 0.5 | 500 | 84 |
| Comparative Example 1-1 | | 20 | 2 | 30 | 28.5 | 510 | 27 | 1.5 | 1.68 | 180 | 4.2 | 0.5 | 500 | 69 |
| Example 2-1 | 34.3 | 7 | 2 | 30 | 25.6 | 250 | 24 | 1.6 | 0.72 | 512 | 4.3 | 0.5 | 500 | 90 |
| Example 2-2 | | 7 | 2 | 30 | 25.6 | 250 | 24 | 1.6 | 0.72 | 511 | 4.3 | 0.5 | 500 | 80 |
| Example 2-3 | | 9 | 2 | 33 | 29.6 | 280 | 21 | 1.5 | 0.70 | 346 | 4.2 | 0.5 | 500 | 90 |
| Example 2-4 | | 9 | 2.5 | 34 | 29.7 | 240 | 24 | 1.5 | 0.70 | 332 | 4.2 | 0.5 | 500 | 90 |
| Example 2-5 | | 9 | 2 | 33 | 29.6 | 280 | 21 | 1.5 | 0.70 | 331 | 4.2 | 0.5 | 500 | 80 |
| Example 2-6 | | 5 | 2 | 35 | 28.9 | 110 | 31 | 1.5 | 0.41 | 500 | 4.2 | 0.5 | 500 | 95 |
| Example 2-7 | | 9 | 1.6 | 45 | 42.3 | 80 | 37 | 1.3 | 0.35 | 397 | 4.35 | 0.5 | 500 | 93 |
| Example 2-8 | | 12 | 1.4 | 44 | 42.2 | 161 | 24 | 1.3 | 0.47 | 310 | 4.2 | 0.5 | 500 | 93 |
| Example 2-9 | | 7 | 2 | 32 | 27.6 | 200 | 26 | 1.6 | 0.62 | 512 | 4.35 | 0.5 | 500 | 90 |
| Example 2-10 | | 16 | 1.5 | 45 | 43.6 | 235 | 21 | 1.3 | 0.59 | 226 | 4.35 | 0.5 | 500 | 85 |
| Example 2-11 | | 9 | 2 | 33 | 29.6 | 280 | 21 | 1.5 | 0.70 | 397 | 4.35 | 0.5 | 500 | 82 |
| Comparative Example 2-1 | | 16 | 1.5 | 35 | 33.6 | 450 | 18 | 1.4 | 0.98 | 226 | 4.2 | 0.5 | 500 | 60 |
| Comparative Example 2-2 | | 16 | 2 | 38 | 36.1 | 500 | 14 | 1.4 | 0.85 | 226 | 4.2 | 0.5 | 500 | 44 |
| Comparative Example 2-3 | | 20 | 2 | 30 | 28.5 | 510 | 27 | 1.5 | 1.68 | 200 | 4.2 | 0.5 | 500 | 36 |
| Example 3-1 | 36.3 | 7 | 2 | 32 | 27.6 | 200 | 26 | 1.6 | 0.62 | 548 | 4.35 | 0.5 | 500 | 80 |
| Example 3-2 | | 7 | 2.5 | 38 | 32.5 | 140 | 27 | 1.5 | 0.45 | 548 | 4.35 | 0.5 | 500 | 90 |
| Example 3-3 | | 9 | 3.5 | 35 | 29.0 | 210 | 29 | 1.5 | 0.73 | 445 | 4.2 | 0.5 | 500 | 80 |
| Example 3-4 | | 7 | 3 | 35 | 28.4 | 230 | 21 | 1.5 | 0.59 | 481 | 4.2 | 0.5 | 500 | 84 |
| Example 3-5 | | 12 | 1.4 | 44 | 42.2 | 161 | 24 | 1.3 | 0.47 | 346 | 4.2 | 0.5 | 500 | 82 |

TABLE 1-continued

| | Positive electrode | | Separator | | | | | | | | Evaluation | | | |
|---|---|---|---|---|---|---|---|---|---|---|---|---|---|---|
| | Area density of positive electrode active material layer S [mg/cm²] | Film thickness L [μm] | Surface roughness maximum height Rz [μm] | Porosity before correction ε [%] | Corrected porosity ε' [%] | Air permeability T [sec/100 cc] | Pore size d [nm] | tortuosity factor τ | Film resistance Ri [μm] | Volume energy density [Wh/L] | Voltage [V] | Rate [C] | The number of cycles | Cycle retention rate [%] |
| Example 3-6 | | 7 | 2 | 30 | 25.6 | 250 | 24 | 1.6 | 0.72 | 511 | 4.3 | 0.5 | 500 | 80 |
| Example 3-7 | | 9 | 2 | 33 | 29.6 | 280 | 21 | 1.5 | 0.70 | 410 | 4.2 | 0.5 | 500 | 73 |
| Example 3-8 | | 16 | 1.5 | 45 | 44.6 | 235 | 20 | 1.3 | 0.57 | 300 | 4.2 | 0.5 | 500 | 75 |
| Example 3-9 | | 9 | 2 | 33 | 29.6 | 280 | 21 | 1.5 | 0.70 | 407 | 4.35 | 0.5 | 500 | 73 |
| Example 3-10 | | 12 | 1.5 | 35 | 33.1 | 394 | 16 | 1.4 | 0.75 | 346 | 4.2 | 0.5 | 500 | 70 |
| Comparative Example 3-1 | | 16 | 1.5 | 35 | 33.6 | 450 | 18 | 1.4 | 0.98 | 326 | 4.2 | 0.5 | 500 | 52 |
| Comparative Example 3-2 | | 16 | 2 | 38 | 36.1 | 500 | 14 | 1.4 | 0.85 | 326 | 4.2 | 0.5 | 500 | 33 |
| Comparative Example 3-3 | | 20 | 2 | 30 | 28.5 | 510 | 27 | 1.5 | 1.68 | 250 | 4.2 | 0.5 | 500 | 28 |
| Example 4-1 | 38.5 | 5 | 2 | 35 | 28.9 | 110 | 31 | 1.5 | 0.41 | 579 | 4.35 | 0.5 | 500 | 80 |
| Example 4-2 | | 7 | 2.5 | 38 | 32.5 | 140 | 27 | 1.5 | 0.45 | 510 | 4.35 | 0.5 | 500 | 77 |
| Example 4-3 | | 9 | 1.6 | 45 | 42.3 | 80 | 37 | 1.3 | 0.35 | 457 | 4.35 | 0.5 | 500 | 80 |
| Example 4-4 | | 12 | 1.4 | 44 | 42.2 | 161 | 24 | 1.3 | 0.47 | 380 | 4.2 | 0.5 | 500 | 73 |
| Example 4-5 | | 7 | 3 | 35 | 28.4 | 230 | 21 | 1.5 | 0.59 | 509 | 4.2 | 0.5 | 500 | 76 |
| Example 4-6 | | 9 | 3.5 | 35 | 29.0 | 210 | 29 | 1.5 | 0.73 | 445 | 4.2 | 0.5 | 500 | 70 |
| Example 4-7 | | 9 | 2 | 33 | 29.6 | 280 | 21 | 1.5 | 0.70 | 446 | 4.2 | 0.5 | 500 | 70 |
| Comparative Example 4-1 | | 16 | 1.5 | 46 | 44.6 | 235 | 20 | 1.3 | 0.57 | 326 | 4.2 | 0.5 | 500 | 62 |
| Comparative Example 4-2 | | 12 | 1.5 | 35 | 33.1 | 394 | 16 | 1.4 | 0.75 | 399 | 4.2 | 0.5 | 500 | 55 |
| Example 5-1 | 42.0 | 7 | 3 | 35 | 28.4 | 230 | 21 | 1.5 | 0.59 | 497 | 4.2 | 0.5 | 500 | 73 |
| Comparative Example 5-1 | | 9 | 3.5 | 35 | 29.0 | 210 | 29 | 1.5 | 0.73 | 445 | 4.2 | 0.5 | 500 | 52 |

In addition, for easy understanding of whether or not Examples and Comparative Examples satisfy the following Expressions, FIG. 9 to FIG. 13 illustrate L-Ri coordinate planes (L-Ri planes) in a case where the area density (S) is a predetermined value (31.1 mg/cm$^2$, 34.3 mg/cm$^2$, 36.3 mg/cm$^2$, 38.5 mg/cm$^2$, 42 mg/cm$^2$).

$$0.04 \leq Ri \leq -0.07L - 0.09 \times S + 4.99$$

$$Ri = \tau^2 L/\varepsilon'$$

$$\varepsilon' = [\{(L \times \varepsilon/100) - Rz \times 0.46/3\}/L] \times 100$$

$$\tau = \{(1.216 \times \varepsilon' Td \times 10^{-4})/L\}^{0.5} \quad \text{(Expressions)}$$

[provided that, Ri: a film resistance (μm), L: a film thickness (μm), τ: a tortuosity factor, T: air permeability (sec/100 cc), d: a pore size (nm), Rz: a surface roughness maximum height (the sum of values of a front surface and a rear surface) (μm), ε: porosity (%), ε': corrected porosity (%), and S: the area density of the positive electrode active material layer (mg/cm$^2$)]

The measurement values of Examples and Comparative Examples were plotted on the L-Ri coordinate planes of FIG. 9 to FIG. 13. In a case where plotted points are in ranges of a region S1 to a region S5, it can be said that the separator (polyethylene film) composed of a porous film has a structure satisfying relationships of the above-described Expressions, and in a case where the plotted points are out of ranges of the region S1 to the region S5, it can be said that the separator (polyethylene film) does not have the structure satisfying the relationships of the above-described Expressions.

In addition, the regions S1 to S5, $Ri_{min}$, and $Ri_{max}$ which are respectively illustrated in FIG. 9 to FIG. 13 are derived in accordance with the above-described Expressions. Hereinafter, relational expressions of the regions S1 to S5, $Ri_{min}$, and $Ri_{max}$ will be described.

(Region S1)

$$\text{Region S1: } Ri_{min} \leq Ri \leq Ri_{max}$$

$$Ri_{min} = 0.40$$

$$Ri_{max} = -0.07L - 0.09 \times S + 4.99 \quad (S=31.1)$$

(Region S2)

$$\text{Region S2: } Ri_{min} \leq Ri \leq Ri_{max}$$

$$Ri_{min} = 0.40$$

$$Ri_{max} = -0.07L - 0.09 \times S + 4.99 \quad (S=34.3)$$

(Region S3)

$$\text{Region S3: } Ri_{min} \leq Ri \leq Ri_{max}$$

$$Ri_{min} = 0.40$$

$$Ri_{max} = -0.07L - 0.09 \times S + 4.99 \quad (S=36.3)$$

(Region S4)

$$\text{Region S4: } Ri_{min} \leq Ri \leq Ri_{max}$$

$$Ri_{min} = 0.40$$

$$Ri_{max} = -0.07L - 0.09 \times S + 4.99 \quad (S=38.5)$$

(Region S5)

$$\text{Region S5: } Ri_{min} \leq Ri \leq Ri_{max}$$

$$Ri_{min} = 0.40$$

$$Ri_{max} = -0.07L - 0.09 \times S + 4.99 \quad (S=42.0)$$

As illustrated in Table 1, and FIG. 9 to FIG. 13, in Examples 1-1 to 5-1 which satisfy the relationships of the above-described Expressions, cycle characteristics were excellent. On the other hand, in Comparative Examples 1-1 to Comparative Example 5-1 which do not satisfy the relationships of the above-described Expressions, the cycle characteristics were not excellent. In addition, a capacity retention rate in a cycle test which is demanded for an ordinary user is approximately 70%. Accordingly, during characteristic evaluation, the value (70%) was set as a reference value, and in a case where the capacity retention rate is equal to or greater than the reference value, the cycle characteristics were determined as excellent.

In addition, a preferable film thickness range of the separator has been examined as follows from the viewpoint of the energy density of the battery. Specifically, values of the film thickness L and the volume energy density W (Wh/L) of the battery were plotted on a coordinate plane of the horizontal axis x:L (film thickness) and the vertical axis y:$\log_{10}(w)$ for each area density $S_x$ of 31.3 (mg/cm$^2$), 34.3 (mg/cm$^2$), 36.3 (mg/cm$^2$), 38.5 (mg/cm$^2$), or 42.0 (mg/cm$^2$) in the positive electrode active material layer.

In addition, an approximate straight line (primary function: y=ax+b) for each area density $S_x$ was obtained on the basis of the plotting, and then an intersection (x, y)=($L_{max}$, $\log_{10}(300)$) between the approximate straight line and a y value: $\log_{10}(300)$ of the volume energy density W=300 (Wh/L) of the battery was calculated. In addition, the calculated value of $L_{max}$ represents the maximum film thickness of the separator which satisfies the volume energy density of 300 Wh/L or greater in the area density $S_x$.

Next, (x, y)=($S_x$, $L_{max}$) were plotted on the coordinate plane of the horizontal axis x:S (area density) and the vertical axis y:L (film thickness). In addition, an approximate curve (secondary function: y=px$^2$+qx+r) was obtained on the basis of the plotting. The y value in the area density x=S of the obtained approximate curve (y=−0.0874x$^2$+6.9788x−122.66) represents the maximum film thickness that satisfies the volume energy density of 300 Wh/L. Accordingly, in a case where the film thickness L of the separator is −0.0873S$^2$+6.9788S−122.66 μm or less, the volume energy density of the battery becomes 300 Wh/L or greater. From these, it could be seen that when the film thickness L of the separator is −0.0873S$^2$+6.9788S−122.66 μm or less, the volume energy density of the battery becomes 300 Wh/L or greater.

4. Other Embodiments

The present disclosure is not limited to the above-described embodiments of the present disclosure, and various modification or applications can be made in a range not departing from the gist of the present disclosure.

For example, the dimensions, the structures, the shapes, the materials, the raw materials, the manufacturing processes, and the like, which are exemplified in the above-described embodiments and examples, are illustrative only, and different dimensions, structures, shapes, materials, raw materials, manufacturing processes, and the like may be used as necessary.

In addition, the configurations, the methods, the processes, the shapes, the materials, the dimensions, and the like in the above-described embodiments and examples may be combined with each other as long as the combination does not depart from the gist of the present disclosure.

The battery according to the above-described embodiments is not limited to the secondary battery, and may be a primary battery.

In the above-described embodiments and examples, description has been made with respect to a battery having a laminate film type battery structure in which a laminate film is used in an exterior packaging member, and a battery having a wound structure in which electrodes are wound, but there is no limitation thereto. For example, the present disclosure is also applicable to batteries having other structures such as a cylindrical battery, a stack type battery having a structure in which electrodes are stacked, an angular type battery, a coin type battery, a flat plate type battery, and a button type battery. Examples of the stack type include a battery structure in which a positive electrode and a negative electrode are laminated through each sheet of separator, a battery structure in which the positive electrode and the negative electrode are laminated through a sheet of strip-shaped separator that is folded in a zigzag folding type, a battery structure in which the positive electrode and the negative electrode are laminated through a pair of separators folded in a zigzag folding type in a state in which the negative electrode is interposed therebetween, and the like. In addition, for example, the surface layer $35a$ that constitutes the second separator $35$ may have a configuration in which particles are omitted.

In addition, as the electrolyte $36$, a solid electrolyte and the like may be used. The electrolyte $36$ may contain an ionic liquid (an ordinary temperature molten salt). The electrolyte $36$ may be a liquid electrolyte solution.

The present disclosure may employ the following configurations.

[1] A battery, including:
a positive electrode that includes a positive electrode current collector, and a positive electrode active material layer which includes a positive electrode active material and is provided on both surfaces of the positive electrode current collector;
a negative electrode;
a separator that includes at least a porous film; and
an electrolyte,
wherein the positive electrode active material includes a positive electrode material including a lithium cobalt composite oxide which has a layered structure and includes at least lithium and cobalt,
an area density S (mg/cm$^2$) of the positive electrode active material layer is 27 mg/cm$^2$ or greater, and
the porous film satisfies the following Expressions.

$0.04 \leq Ri \leq -0.07L - 0.09 \times S + 4.99$ $Ri = \tau^2 L/\varepsilon'$ $\varepsilon' = [\{(L \times \varepsilon/100) - Rz \times 0.46/3\}/L] \times 100$ $\tau = \{(1.216 \times \varepsilon' T d \times 10^{-4})/L\}^{0.5}$ (Expressions)

[provided that, Ri: a film resistance (μm), L: a film thickness (μm), τ: a tortuosity factor, T: air permeability (sec/100 cc), d: a pore size (nm), Rz: a surface roughness maximum height (the sum of values of a front surface and a rear surface) (μm), ε: porosity (%), ε': corrected porosity (%), and S: the area density of the positive electrode active material layer (mg/cm$^2$)]

[2] The battery according to [1],
wherein the electrolyte includes an electrolyte solution and a polymer compound, and the electrolyte is a gel-type electrolyte in which the electrolyte solution is retained by the polymer compound.

[3] The battery according to [1] or [2],
wherein the electrolyte further includes particles.

[4] The battery according to any one of [1] to [3],
wherein the area density S (mg/cm$^2$) of the positive electrode active material layer is 51 mg/cm$^2$ or less.

[5] The battery according to any one of [1] to [4],
wherein the thickness of the separator is 3 μm to 17 μm.

[6] The battery according to any one of [1] to [5],
wherein the positive electrode material is a coating particle that further includes a coating layer provided at least on a part of a surface of a particle of the lithium cobalt composite oxide.

[7] The battery according to any one of [1] to [6],
wherein the lithium cobalt composite oxide is at least one kind of a lithium cobalt composite oxide expressed by General Formula (Chem. 1).

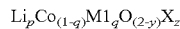  (Chem. 1)

(In Formula, M1 represents at least one kind excluding cobalt (Co) among elements selected from Group 2 to Group 15, and X represents at least one kind excluding oxygen (O) among elements in Group 16 and elements in Group 17. p, q, y, and z are values in ranges of $0.9 \leq p \leq 1.1$, $0 \leq q \leq 0.5$, $-0.10 \leq y \leq 0.20$, and $0 \leq z \leq 0.1$.)

[8] The battery according to any one of [1] to [7],
wherein the separator further includes a surface layer which is provided at least on one main surface of the porous film and which includes particles and a resin.

[9] The battery according to any one of [1] to [8],
wherein the porous film is a polyolefin resin film.

[10] The battery according to any one of [1] to [9],
wherein the thickness of the separator is $-0.0873S^2 + 6.9788S - 122.66$ μm or less.

[11] The battery according to any one of [1] to [10],
wherein the positive electrode, the negative electrode, the separator, and the electrolyte are accommodated in a film-shaped exterior packaging member.

[12] The battery according to any one of [1] to [11],
wherein an open-circuit voltage in a fully charged state per a pair of the positive electrode and the negative electrode is 4.25 V or higher.

[13] A battery pack, including:
the battery according to any one of [1] to [12];
a control unit that controls the battery; and
an exterior packaging member in which the battery is accommodated.

[14] An electronic apparatus, including:
the battery according to any one of [1] to [12],
wherein electric power is supplied from the battery.

[15] An electrically driven vehicle, including:
the battery according to any one of [1] to [12];
a converting device to which electric power is supplied from the battery, and which converts the electric power to a driving force of a vehicle; and
a control device that performs information processing relating to vehicle control on the basis of information relating to the battery.

[16] An electrical storage device, including:
the battery according to any one of [1] to [12],
wherein the electrical storage device supplies electric power to an electronic apparatus that is connected to the battery.

[17] The electrical storage device according to [16], further including:
a power information control device that transmits and receives a signal to and from other apparatuses through a network, wherein charging and discharging control of the battery is performed on the basis of information that is received by the power information control device.

[18] A power system,
wherein electric power is supplied from the battery according to any one of [1] to [11], or electric power is supplied to the battery from a power generating device or a power network.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

30 Wound electrode body
31 Positive electrode lead
32 Negative electrode lead
33 Positive electrode
33A Positive electrode current collector
33B Positive electrode active material layer
34 Negative electrode
34A Negative electrode current collector
34B Negative electrode active material layer
35 Separator
35a Porous film
35b Surface layer
36 Electrolyte
37 Protective tape
40 Exterior packaging member
41 Adhesive film
101 Battery cell
101a Terrace portion
102a, 102b Lead
103a to 103c Insulating tape
104 Insulating plate
105 Circuit substrate
106 Connector
301 Assembled battery
301a Secondary battery
302a Charging control switch
302b Diode
303a Discharging control switch
303b Diode
304 Switch unit
307 Current detecting resistor
308 Temperature detecting element
310 Control unit
311 Voltage detecting unit
313 Current measuring unit
314 Switch control unit
317 Memory
318 Temperature detecting unit
321 Positive electrode terminal
322 Negative electrode terminal
400 Electrical storage system
401 House
402 Centralized power system
402a Thermal power generation
402b Nuclear power generation
402c Hydraulic power generation
403 Electrical storage device
404 Power generating device
405 Power consuming device
405 a Refrigerator
405b Air conditioner
405c Television
405d Bath
406 Electrically driven vehicle
406a Electric vehicle
406b Hybrid car
406c Electric bike
407 Smart meter
408 Power hub
409 Power network
410 Control device
411 Sensor
412 Information network
413 Server
500 Hybrid vehicle
501 Engine
502 Generator
503 Electric power-driving force converting device
504a Driving wheel
504b Driving wheel
505a Wheel
505b Wheel
508 Battery
509 Vehicle control device
510 Sensor
511 Charging port

The invention claimed is:

1. A battery comprising:
a positive electrode that includes a positive electrode current collector and a positive electrode active material layer provided on the positive electrode current collector;
a negative electrode; and
a separator that includes at least a porous film;
wherein the porous film satisfies the following expressions:

$$0.04 \leq Ri \leq -0.07L - 0.09 \times S + 4.99$$

$$Ri = \tau^2 L/\varepsilon'$$

$$\varepsilon' = [\{(L \times \varepsilon/100) - Rz \times 0.46/3\}/L] \times 100$$

$$\tau = \{(1.216 \times \varepsilon' \cdot Td \times 10^{-4})/L\}^{0.5}$$

where Ri represents a film leakage resistance (μm), L represents a film thickness (μm), τ represents a tortuosity factor, T represents air permeability (sec/100 cc), d represents a pore size (nm), Rz represents a surface roughness maximum height (μm), ε represents a porosity (%), ε' represents a corrected porosity (%), and S represents an area density of the positive electrode active material layer (mg/cm$^2$).

2. The battery according to claim 1,
wherein the battery includes an electrolyte including an electrolyte solution retained by a polymer compound.

3. The battery according to claim 2,
wherein the electrolyte further includes particles.

4. The battery according to claim 2,
wherein the positive electrode, the negative electrode, the separator, and the electrolyte are provided in a film-shaped exterior packaging member.

5. The battery according to claim 1,
wherein a thickness of the separator is in a range of 3 μm to 17 μm.

6. The battery according to claim 1,
wherein the positive electrode includes a coating particle that includes a coating layer provided at least on a part of a surface of the positive electrode active material layer.

7. The battery according to claim 6,
wherein the coating layer comprises:
(1) an oxide including one or more of lithium (Li), nickel (Ni), and manganese (Mn),
(2) a compound including one or more of nickel (Ni), cobalt (Co), manganese (Mn), iron (Fe), aluminum (Al), magnesium (Mg), and zinc (Zn), oxygen (O), and phosphorus (P), or
(3) lithium fluoride or a chalcogenide other than oxygen.

8. The battery according to claim 6,
wherein the coating layer comprises:
(1) at least one element M selected from Group 2 to Group 16, and
(2) at least one element X selected from phosphorous (P), silicon (Si), germanium (Ge), and a halogen element.

9. The battery according to claim 1,
wherein the separator further includes a surface layer which is provided at least on one main surface of the porous film and which includes one or both of particles and a resin.

10. The battery according to claim 9,
wherein the particles comprise at least one material selected from aluminum oxide (alumina), boehmite, magnesium oxide (magnesia), titanium oxide (titania), zirconium oxide (zirconia), silicon oxide (silica), yttrium oxide (yttria), zinc oxide, a silicon nitride, aluminum nitride, boron nitride, and titanium nitride, silicon carbide, boron carbide, barium sulfate, aluminum hydroxide, zeolite, talc, barium titanate, and strontium titanate.

11. The battery according to claim 9,
wherein the resin comprises at least one material selected from polyvinylidene fluoride, polytetrafluoroethylene, vinylidene fluoride-tetrafluoroethylene copolymer, ethylene-tetrafluoroethylene copolymer, styrene-butadiene copolymer and a hydride thereof, an acrylonitrile-butadiene copolymer and a hydride thereof, and, an acrylonitrile-butadiene-styrene copolymer and a hydride thereof.

12. The battery according to claim 1,
wherein the porous film is a polyolefin resin film.

13. The battery according to claim 1,
wherein a thickness of the separator satisfies a range of $-0.0873S^2+6.9788S-122.66$ or less.

14. The battery according to claim 1,
wherein an open-circuit voltage in a fully charged state per a pair of the positive electrode and the negative electrode is 4.25 V or higher.

15. The battery according to claim 1,
wherein the positive electrode active material layer comprises a binder agent including at least one resin material selected from polyvinylidene fluoride (PVdF), polytetrafluoroethylene (PTFE), polyacrylonitrile (PAN), styrene-butadiene rubber (SBR), and carboxymethyl cellulose (CMC).

16. The battery according to claim 1,
wherein the porosity ε of the porous film is in a range of 20% to 57%.

17. The battery according to claim 1,
wherein the air permeability T of the porous film is in a range of 50 sec/100 cc to 500 sec/100 cc.

18. The battery according to claim 1,
wherein the negative electrode includes one or more of tin (Sn), lead (Pb), aluminum (Al), indium (In), silicon (Si), zinc (Zn), antimony (Sb), bismuth (Bi), gallium (Ga), germanium (Ge), arsenic (As), silver (Ag), hafnium (Hf), zirconium (Zr) and yttrium (Y).

19. The battery according to claim 1,
wherein the negative electrode comprises an alloy of tin including one or more of silicon, magnesium, nickel, copper, iron, cobalt, manganese, zinc, indium, silver, titanium, germanium, bismuth, antimony and chromium.

20. The battery according to claim 1,
wherein the negative electrode comprises an alloy of silicon including one or more of tin, magnesium, nickel, copper, iron, cobalt, manganese, zinc, indium, silver, titanium, germanium, bismuth, antimony and chromium.

21. The battery according to claim 1, wherein the negative electrode comprises compounds of tin or silicon, and wherein the compounds include oxygen (O) or carbon (C).

22. A battery pack, comprising:
the battery according to claim 1;
a control unit that controls the battery; and
an exterior packaging member configured to accommodate the battery.

23. An electronic apparatus, comprising:
the battery according to claim 1.

24. An electrically driven vehicle, comprising:
the battery according to claim 1;
a converting device to which electric power is supplied from the battery, and which converts the electric power to a driving force; and
a control device that performs information processing relating to vehicle control based on information relating to the battery.

25. An electrical storage device, comprising:
the battery according to claim 1,
wherein the electrical storage device is configured to supply electric power to an electronic apparatus.

26. The electrical storage device according to claim 25, further comprising:
a power information control device that transmits and receives a signal to and from other apparatuses through a network,
wherein charging and discharging control of the battery is based on information that is received by the power information control device.

27. A power system,
wherein electric power is supplied from the battery according to claim 1, or electric power is supplied to the battery of claim 1 from a power generating device or a power network.

* * * * *